US010595236B2

(12) United States Patent
Chang et al.

(10) Patent No.: US 10,595,236 B2
(45) Date of Patent: Mar. 17, 2020

(54) COMMUNICATION METHOD, NETWORK SIDE DEVICE, AND USER TERMINAL

(71) Applicant: Huawei Technologies Co., Ltd., Shenzhen (CN)

(72) Inventors: Junren Chang, Beijing (CN); Liangliang Zhang, Beijing (CN); Wei Quan, Beijing (CN); Shulan Feng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/145,653

(22) Filed: Sep. 28, 2018

(65) Prior Publication Data

US 2019/0037450 A1    Jan. 31, 2019

Related U.S. Application Data

(63) Continuation of application No. PCT/CN2016/078214, filed on Mar. 31, 2016.

(51) Int. Cl.
*H04W 36/00* (2009.01)
*H04W 36/18* (2009.01)
(Continued)

(52) U.S. Cl.
CPC ....... *H04W 36/0016* (2013.01); *H04W 12/04* (2013.01); *H04W 36/0058* (2018.08);
(Continued)

(58) Field of Classification Search
CPC . H04W 36/0016; H04W 36/08; H04W 36/18; H04W 36/0027; H04W 36/0033
See application file for complete search history.

(56) References Cited

U.S. PATENT DOCUMENTS 8,676,208 B2    3/2014  Chou et al.
2006/0040662 A1*  2/2006  Kim ...................... H04W 36/30
                                                    455/434
(Continued)

FOREIGN PATENT DOCUMENTS

CN    101466127 A    6/2009
CN    101489270 A    7/2009
(Continued)

OTHER PUBLICATIONS

"3GPP TS 36.331 V13.0.0 (Dec. 2015), 3rd Generation Partnership Project;Technical Specification Group Radio Access Network;Evolved Universal Terrestrial Radio Access (E-UTRA);Radio Resource Control (RRC);Protocol specification (Release 13), 507 pages".
(Continued)

*Primary Examiner* — Dung Hong
(74) *Attorney, Agent, or Firm* — Leydig, Voit & Mayer, Ltd.

(57) ABSTRACT

Embodiments of the present disclosure provide a communication method, a network side device, and a user terminal. The method includes: establishing, by a user terminal, a connection to a first base station by using a first component carrier; sending, by the first base station, a preprocessing indication message to the user terminal, to indicate that the user terminal is to perform uplink synchronization with a second base station on a second component carrier; and obtaining, by the first base station, a target second base station, and sending a first indication message to the target second base station, to indicate that the user terminal is to perform data transmission with the target second base station.

17 Claims, 10 Drawing Sheets

(51) Int. Cl.
*H04W 12/04* (2009.01)
*H04W 36/30* (2009.01)
*H04W 92/20* (2009.01)

(52) U.S. Cl.
CPC ....... *H04W 36/0072* (2013.01); *H04W 36/18* (2013.01); *H04W 36/30* (2013.01); *H04W 92/20* (2013.01)

(56) References Cited

U.S. PATENT DOCUMENTS

| | | |
|---|---|---|
| 2008/0102838 A1 | 5/2008 | Takai |
| 2008/0182579 A1 | 7/2008 | Wang et al. |
| 2008/0267127 A1* | 10/2008 | Narasimha ........ H04W 36/0077 370/331 |
| 2009/0061876 A1* | 3/2009 | Ho ........................ H04W 99/00 455/436 |
| 2009/0088164 A1* | 4/2009 | Shen ....................... H04B 7/155 455/436 |
| 2009/0310563 A1* | 12/2009 | Chou ................... H04L 27/0006 370/331 |
| 2011/0103282 A1* | 5/2011 | Jeon ..................... H04W 52/40 370/311 |
| 2011/0128937 A1* | 6/2011 | Iwamura ............... H04W 12/04 370/331 |
| 2012/0202501 A1 | 8/2012 | Morioka et al. |
| 2012/0295625 A1 | 11/2012 | Matsuo et al. |
| 2013/0058308 A1* | 3/2013 | Jaiswal ................ H04W 36/12 370/331 |
| 2013/0210422 A1* | 8/2013 | Pani ...................... H04W 48/16 455/423 |
| 2014/0126545 A1* | 5/2014 | Tamura ................ H04W 36/30 370/332 |
| 2015/0050932 A1* | 2/2015 | Sawada ................ H04W 48/20 455/434 |
| 2015/0156686 A1* | 6/2015 | Kikuchi ................ H04W 36/08 455/437 |
| 2016/0050652 A1* | 2/2016 | Wu ........................ H04L 5/001 370/329 |
| 2016/0057660 A1 | 2/2016 | Hong et al. |
| 2016/0095031 A1* | 3/2016 | Cai ....................... H04W 36/08 455/436 |
| 2016/0205600 A1* | 7/2016 | Xu .................... H04W 36/0072 455/437 |
| 2017/0064587 A1 | 3/2017 | Xu et al. |
| 2018/0199257 A1 | 7/2018 | Kim |
| 2018/0332507 A1 | 11/2018 | Fujishiro et al. |

FOREIGN PATENT DOCUMENTS

| | | |
|---|---|---|
| CN | 101742584 A | 6/2010 |
| CN | 104301954 A | 1/2015 |
| JP | 2008118229 A | 5/2008 |
| JP | 2011097443 A | 5/2011 |
| KR | 20110120822 A | 11/2011 |
| KR | 20140118681 A | 10/2014 |
| WO | 2015027524 A1 | 3/2015 |
| WO | 2015108389 A1 | 7/2015 |
| WO | 2015130852 A2 | 9/2015 |
| WO | 2016004627 A1 | 1/2016 |
| WO | 2017130852 A1 | 8/2017 |

OTHER PUBLICATIONS

"3GPP TS 36.423 V13.3.0 (Mar. 2016), 3rd Generation Partnership Project;Technical Specification Group Radio Access Network;Evolved Universal Terrestrial Radio Access Network(E-UTRAN);X2 application protocol (X2AP)(Release 13), 230 pages".

"3GPP TR 36.881 V0.6.0 (Feb. 2016), 3rd Generation Partnership Project;Technical Specification Group Radio Access Network;Evolved Universal Terrestrial Radio Access (E-UTRA);Study on latency reduction techniques for LTE (Release 13), 92 pages".

* cited by examiner

COMMUNICATION METHOD, NETWORK SIDE DEVICE, AND USER TERMINAL

CROSS-REFERENCE TO RELATED APPLICATIONS

This application is a continuation of International Application No. PCT/CN2016/078214, filed on Mar. 31, 2016, the disclosure of which is hereby incorporated by reference in its entirety.

TECHNICAL FIELD

Embodiments of the present disclosure relate to communications technologies, and in particular, to a communication method, a network side device, and a user terminal.

BACKGROUND

Long Term Evolution (LTE) is long term evolution of Universal Mobile Telecommunications System (UMTS) technical standards, and is developed by the 3rd Generation Partnership Project (3GPP) organization. In an LTE network, when a user equipment (UE) moves from a coverage area of a base station managed by a mobility management entity (MME) to a coverage area of another base station during movement, hard handover processing needs to be performed.

A main working principle of hard handover performed for a UE is as follows: the UE first measures signal strength of a current serving cell, measures signal strength of a neighboring cell of the current serving cell when the signal strength of the current serving cell is lower than a first specified threshold, and reports a measurement result of the UE to a source base station. The source base station determines, based on the signal strength of the neighboring cell obtained through measurement, a target base station to which the UE may be handed over; and when the signal strength of the current serving cell is lower than a second specified threshold, generates a handover request and sends the handover request to the target base station. The target base station performs admission control according to the handover request, and sends a handover acknowledgment message to the source base station. Then, the source base station sends a handover command to the UE. After receiving the handover command, the UE immediately disconnects a connection to the source base station, and is uplink synchronized with the target base station in a random access mode. After successful random access, the UE can communicate with the target base station.

However, in the hard handover mode, after disconnecting the connection to the source base station, the UE accesses the target base station by using a random access procedure. Therefore, a relatively great latency is caused.

SUMMARY

Embodiments of the present disclosure provide a communication method, a network side device, a user terminal, and a communications system, to resolve a problem that a relatively great latency is caused when a hard handover mode is used to hand over a UE to a target base station.

According to a first aspect, an embodiment of the present disclosure provides a communication method, including:

determining, by a first base station based on a received first measurement report sent by a user terminal, a second base station that the user terminal is to preprocess, where the preprocessing includes pre-handover to or pre-addition of the second base station, but does not include data transmission by using the second base station, the first base station is connected to the user terminal by using a first component carrier, and the first measurement report includes signal quality information of a current serving cell and signal quality information of a neighboring cell of the current serving cell;

sending, by the first base station, a first request message to the second base station, where the first request message includes indication information indicating that the user terminal is to preprocess the second base station;

determining, by the first base station when receiving a first acknowledgment message returned by the second base station, that the user terminal is capable of preprocessing the second base station, and sending a preprocessing indication message to the user terminal, where the preprocessing indication message includes information about a second component carrier on which the user terminal performs uplink synchronization with the second base station when performing the preprocessing, and the second component carrier is different from the first component carrier;

obtaining, by the first base station, information about a target second base station with which the user terminal is to perform data transmission; and sending, by the first base station, a first indication message to the target second base station, or sending the first indication message to the target second base station and a second indication message to the user terminal, to instruct the user terminal to be handed over to the target second base station for data transmission, or to instruct the user terminal to add the target second base station for data transmission.

Optionally, the first measurement report includes a first measurement result corresponding to the current serving cell and a second measurement result corresponding to the neighboring cell of the current serving cell; and the determining, by the first base station based on the received first measurement report sent by the user terminal, the second base station that the user terminal is capable of preprocessing includes:

if the first measurement result is less than a first threshold, determining, by the first base station based on the second measurement result, at least one second base station corresponding to the second measurement result as the second base station that the user terminal is to preprocess, where the second measurement result is greater than the first measurement result.

Optionally, the obtaining, by the first base station, information about a target second base station with which the user terminal is to perform data transmission; and sending a first indication message to the target second base station, or sending the first indication message to the target second base station and a second indication message to the user terminal includes:

receiving, by the first base station, a third indication message sent by the user terminal, where the third indication message carries an identifier of the target second base station, and the target second base station is determined by the user terminal based on a second measurement report; and sending, by the first base station, the first indication message to the target second base station, where the second measurement report includes signal quality information of the current serving cell and is different from the first measurement report; or determining, by the first base station, the target second base station based on a second measurement report sent by the user terminal, and sending the first indication message to the target second base station and the second indication message to the user terminal.

Optionally, the first request message further includes a configuration instruction for configuring information, so that the second base station pre-configures an SRB and a DRB for the user terminal according to the configuration instruction; and both the first acknowledgment message and the preprocessing indication message include configuration information of the SRB and configuration information of the DRB.

Optionally, the sending the first indication message to the target second base station and a second indication message to the user terminal includes:

sending the first indication message to the target second base station;

receiving a second acknowledgment message returned by the target second base station, where the second acknowledgment message includes SRB configuration information and DRB configuration information that are pre-configured by the target second base station for the user terminal; and sending, to the user terminal, the second indication message that carries the SRB configuration information and the DRB configuration information.

Optionally, the first request message further includes indication information for instructing the second base station to establish an SRB, and establish a DRB or pre-configure configuration information of a DRB for the user terminal;

both the first acknowledgment message and the preprocessing indication message include information about the established SRB, and information about the established DRB or the configuration information of the DRB; and when the preprocessing indication message includes the information about the established SRB and the configuration information of the DRB, the preprocessing indication message further includes indication information indicating that the second base station has established, based on the configuration information of the DRB, the DRB for the user terminal.

Optionally, the first indication message includes a first intermediate key between the second base station and the user terminal produced by the first base station for the second base station, and information for instructing the user terminal to produce the first intermediate key between the user terminal and the target second base station based on a second intermediate key between the user terminal and the first base station, and produce a final key between the user terminal and the second base station based on the first intermediate key, where the final key is used to encrypt data transmitted by the user terminal to the second base station.

Optionally, the preprocessing indication message includes:

security key information between the user terminal and the second base station pre-configured by the first base station for the user terminal, so that when receiving the second indication message, the user terminal produces the first intermediate key between the user terminal and the second base station by using the second intermediate key between the user terminal and the first base station and the security key information.

Optionally, the preprocessing indication message includes second-base-station security algorithm information pre-configured by the first base station for the user terminal; and the second indication message sent by the first base station to the user terminal includes security key counter information pre-configured by the first base station for the user terminal, so that when receiving the second indication message, the user terminal produces the first intermediate key between the user terminal and the second base station by using the second intermediate key between the user terminal and the first base station, the second-base-station security algorithm information, and the security key counter information.

Optionally, the method further includes:

sending, by the first base station, first data to the target second base station, where the first data is data that the first base station has not sent to the user terminal yet.

Optionally, the method further includes:

sending, by the first base station, a path switching message to an MME, so that the MME switches a data transmission path to the final handed-over-to second base station.

Optionally, the preprocessing indication message further includes a correspondence between the SRB pre-configured by the second base station for the user terminal and an SRB that is maintained by the user terminal and the first base station, and/or a correspondence between the DRB pre-configured by the second base station for the user terminal and a DRB that is maintained by the user terminal and the first base station.

According to a second aspect, an embodiment of the present disclosure further provides a communication method, where the method includes:

receiving, by a second base station, a first request message sent by a first base station, where the first request message includes an identifier of a user terminal and indication information indicating that the user terminal is to preprocess the second base station, and the preprocessing includes pre-handover of the user terminal to the second base station or pre-addition of the second base station, but does not include data transmission by using the second base station;

performing, by the second base station, admission control based on the first request message, and returning a first acknowledgment message to the first base station when determining that the user terminal is allowed to perform preprocessing;

receiving, by the second base station, an access request sent by the user terminal, and synchronizing with the user terminal based on the access request; and receiving, by the second base station, a first indication message sent by the first base station, and performing corresponding handover processing based on the first indication message to implement data transmission with the user terminal.

Optionally, the first request message further includes a configuration instruction for configuring information, and the method further includes:

pre-configuring, by the second base station, an SRB and a DRB for the user terminal according to the configuration instruction, where the first acknowledgment message includes configuration information of the SRB and configuration information of the DRB.

Optionally, the performing corresponding handover processing based on the first indication message to implement data transmission with the user terminal includes:

establishing the SRB and the DRB between the second base station and the user terminal based on the first indication message, and the configuration information of the SRB and the configuration information of the DRB that have been locally stored in the second base station; and sending a path switching message to an MME, so that the MME switches a data transmission path to the second base station based on the received path switching message.

Optionally, the receiving, by the second base station, a first indication message sent by the first base station, and performing corresponding handover processing based on the first indication message to implement data transmission with the user terminal includes:

sending, by the second base station, a second acknowledgment message to the first base station, where the second acknowledgment message includes SRB configuration information and DRB configuration information that are pre-configured by the second base station for the user terminal;

establishing an SRB and a DRB between the second base station and the user terminal based on the first indication message and the SRB configuration information and the DRB configuration information; and sending a path switching message to an MME, so that the MME switches a data transmission path to the second base station based on the received path switching message.

Optionally, the first indication message includes a first intermediate key between the second base station and the user terminal produced by the first base station for the second base station, and indication information indicating that the user terminal is to produce, based on the first intermediate key, a final key between the user terminal and the second base station, and encrypt the transmitted data based on the final key.

Optionally, the method further includes:

receiving, by the second base station, first data sent by the first base station, where the first data is data that the first base station has not sent to the user terminal yet.

Optionally, the method further includes:

producing, by the second base station, a second intermediate key between the second base station and the user terminal based on the first intermediate key of the user terminal in the first base station and a first counter value pre-configured by the first base station for the user terminal, and producing a first final key between the second base station and the user terminal based on the second intermediate key, where the first final key is used to encrypt data transmitted by the second base station to the user terminal;

receiving, by the second base station, a key update request message sent by the first base station;

producing, by the second base station, a third intermediate key by using the first intermediate key of the user terminal in the first base station and a second counter value pre-configured by the second base station for the user terminal; and adding the third intermediate key to a key update response message and sending the key update response message to the first base station, where the second counter value is different from the first counter value; and sending, by the second base station, a first-base-station key update command to the user terminal, where the first-base-station key update command carries the second counter value, so that the user terminal produces the third intermediate key in the first base station based on the first intermediate key and the second counter value, and produces a second final key between the user terminal and the first base station based on the third intermediate key, where the second final key is used to encrypt data transmitted by the user terminal to the first base station.

Optionally, the method further includes:

producing, by the second base station, a fifth intermediate key between the second base station and the user terminal based on a fourth intermediate key of the user terminal in the first base station and a third counter value pre-configured by the first base station for the user terminal, and producing a third final key between the second base station and the user terminal based on the fifth intermediate key, where the third final key is used to encrypt data transmitted by the second base station to the user terminal;

receiving, by the second base station, a key update request sent by the first base station;

producing, by the second base station, a sixth intermediate key by using the fifth intermediate key of the user terminal in the second base station and the third counter value; and adding the sixth intermediate key to a key update response message and sending the key update response message to the first base station; and sending, by the second base station, a key update command to the user terminal, where the key update command carries the fifth intermediate key and the third counter value, so that the user terminal produces the sixth intermediate key in the first base station based on the fifth intermediate key and the third counter value, and produces a fourth final key between the user terminal and the first base station based on the sixth intermediate key, where the fourth final key is used to encrypt data transmitted by the user terminal to the second base station.

According to a third aspect, an embodiment of the present disclosure provides a communication method, including:

sending, by a user terminal, a first measurement report to a first base station, so that the first base station determines, based on the first measurement report, a second base station that the user terminal is to preprocess, where the preprocessing includes pre-handover to or pre-addition of the second base station, but does not include data transmission by using the second base station, the user terminal is connected to the first base station by using a first component carrier, and the first measurement report includes signal quality information of a current serving cell and signal quality information of a neighboring cell of the current serving cell;

receiving, by the user terminal, a preprocessing indication message sent by the first base station, where the preprocessing indication message includes information about a second component carrier on which the user terminal performs uplink synchronization with the second base station when performing the preprocessing, and the second component carrier is different from the first component carrier;

sending, by the user terminal based on the preprocessing indication message, a random access request to the second base station on the second component carrier, to implement the preprocessing on the second base station; and receiving, by the user terminal, a second indication message sent by the first base station, and implementing data transmission between the user terminal and the second base station based on the second indication message.

Optionally, the preprocessing indication message further includes SRB configuration information and DRB configuration information that are pre-configured by the second base station for the user terminal; and the receiving, by the user terminal, a second indication message sent by the first base station, and implementing communication between the user terminal and the second base station based on the second indication message includes:

receiving, by the user terminal, the second indication message sent by the first base station, and establishing an SRB and a DRB between the user terminal and the second base station based on the SRB configuration information and the DRB configuration information, to implement data transmission with the second base station.

Optionally, the second indication message further includes SRB configuration information and DRB configuration information that are pre-configured by the second base station for the user terminal; and the receiving, by the user terminal, a second indication message sent by the first base station, and implementing communication between the user terminal and the second base station based on the second indication message includes:

receiving, by the user terminal, the second indication message sent by the first base station, and establishing an SRB and a DRB between the user terminal and the second base station based on the SRB configuration information and the DRB configuration information in the second indication message, to implement data transmission with the second base station.

Optionally, the method further includes:

producing, by the user terminal, a second intermediate key of the user terminal in the second base station based on a first intermediate key in the first base station and a first counter value pre-configured by the first base station for the user terminal, and producing a first final key of the user terminal in the second base station based on the second intermediate key, where the first final key is used to encrypt data transmitted by the user terminal to the second base station;

receiving, by the user terminal, a first-base-station key update command sent by the second base station, where the first-base-station key update command includes a second counter value pre-configured by the second base station for the user terminal, and the second counter value is different from the first counter value; and producing, by the user terminal, a third intermediate key of the user terminal in the first base station based on the first intermediate key and the second counter value, and producing a second final key of the user terminal in the first base station based on the third intermediate key, where the second final key is used to encrypt data transmitted by the user terminal to the first base station.

Optionally, the method further includes:

producing, by the user terminal, a fifth intermediate key of the user terminal in the second base station based on a fourth intermediate key in the first base station and a third counter value pre-configured by the first base station for the user terminal, and producing a third final key of the user terminal in the second base station based on the fifth intermediate key, where the third final key is used to encrypt data transmitted by the user terminal to the second base station;

receiving, by the user terminal, a first-base-station key update command sent by the second base station, where the first-base-station key update command includes the fifth intermediate key and the third counter value; and producing, by the user terminal, a sixth intermediate key in the first base station based on the fifth intermediate key and the third counter value, and producing a fourth final key between the second base station and the user terminal based on the sixth intermediate key, where the fourth final key is used to encrypt data transmitted by the user terminal to the second base station.

Optionally, the preprocessing indication message further includes indication information for instructing the user terminal to preprocess the second base station, and the user terminal determines, based on the indication information, to maintain a connection to the first base station.

According to a fourth aspect, an embodiment of the present disclosure further provides a network side device, where the device is a first base station and includes:

a processing unit, configured to determine, based on a first measurement report received by the first base station and sent by a user terminal, a second base station that the user terminal is to preprocess, where the preprocessing includes pre-handover to or pre-addition of the second base station, but does not include data transmission by using the second base station, the first base station is connected to the user terminal by using a first component carrier, and the first measurement report includes signal quality information of a current serving cell and signal quality information of a neighboring cell of the current serving cell; and a sending unit, configured to send a first request message to the second base station, where the first request message includes indication information indicating that the user terminal is to preprocess the second base station, where the processing unit is further configured to: when the first base station receives a first acknowledgment message returned by the second base station, determine that the user terminal is capable of preprocessing the second base station;

the sending unit is further configured to send a preprocessing indication message to the user terminal, where the preprocessing indication message includes information about a second component carrier on which the user terminal performs uplink synchronization with the second base station when performing the preprocessing, and the second component carrier is different from the first component carrier;

the processing unit is further configured to obtain information about a target second base station with which the user terminal is to perform data transmission; and the sending unit is further configured to send a first indication message to the target second base station, or send the first indication message to the target second base station and a second indication message to the user terminal, to instruct the user terminal to be handed over to the target second base station for data transmission, or to instruct the user terminal to add the target second base station for data transmission.

Optionally, the first measurement report includes a first measurement result corresponding to the current serving cell and a second measurement result corresponding to the neighboring cell of the current serving cell; and the processing unit is configured to: determine, based on the received first measurement report sent by the user terminal, the second base station that the user terminal is capable of preprocessing; and if the first measurement result is less than a first threshold, determine, based on the second measurement result, at least one second base station corresponding to the second measurement result as the second base station that the user terminal is to preprocess, where the second measurement result is greater than the first measurement result.

Optionally, the device further includes:

a receiving unit, where the receiving unit is configured to receive a third indication message sent by the user terminal, the third indication message carries an identifier of the target second base station, the target second base station is determined by the user terminal based on a second measurement report, and the second measurement report includes signal quality information of the current serving cell and is different from the first measurement report; and the sending unit is configured to: when the receiving unit receives the third indication message, send the first indication message to the target second base station; or the processing unit is configured to determine the target second base station based on a second measurement report sent by the user terminal, and the sending unit is configured to send the first indication message to the target second base station and the second indication message to the user terminal.

Optionally, the first request message further includes a configuration instruction for configuring information, so that the second base station pre-configures an SRB and a DRB for the user terminal according to the configuration instruction; and both the first acknowledgment message and the preprocessing indication message include configuration information of the SRB and configuration information of the DRB.

Optionally, the receiving unit is configured to: after the sending unit sends the first indication message to the target second base station, receive a second acknowledgment message returned by the target second base station, where the second acknowledgment message includes SRB configuration information and DRB configuration information that are pre-configured by the target second base station for the user terminal; and the sending unit is specifically configured to send, to the user terminal, the second indication message that carries the SRB configuration information and the DRB configuration information.

Optionally, the first request message further includes indication information for instructing the second base station to establish an SRB, and establish a DRB or pre-configure configuration information of a DRB for the user terminal;

both the first acknowledgment message and the preprocessing indication message include information about the established SRB, and information about the established DRB or the configuration information of the DRB; and when the preprocessing indication message includes the information about the established SRB and the configuration information of the DRB, the preprocessing indication message further includes indication information indicating that the second base station has established, based on the configuration information of the DRB, the DRB for the user terminal.

Optionally, the first indication message includes a first intermediate key between the second base station and the user terminal produced by the first base station for the second base station, and information for instructing the user terminal to produce the first intermediate key between the user terminal and the target second base station based on a second intermediate key between the user terminal and the first base station, and produce a final key between the user terminal and the second base station based on the first intermediate key, where the final key is used to encrypt data transmitted by the user terminal to the second base station.

Optionally, the preprocessing indication message includes:

security key information between the user terminal and the second base station pre-configured by the first base station for the user terminal, so that when receiving the second indication message, the user terminal produces the first intermediate key between the user terminal and the second base station by using the second intermediate key between the user terminal and the first base station and the security key information.

Optionally, the preprocessing indication message includes second-base-station security algorithm information pre-configured by the first base station for the user terminal; and the second indication message sent by the first base station to the user terminal includes security key counter information pre-configured by the first base station for the user terminal, so that when receiving the second indication message, the user terminal produces the first intermediate key between the user terminal and the second base station by using the second intermediate key between the user terminal and the first base station, the second-base-station security algorithm information, and the security key counter information.

Optionally, the sending unit is further configured to send first data to the target second base station, where the first data is data that the first base station has not sent to the user terminal yet.

Optionally, the sending unit is further configured to send a path switching message to an MME, so that the MME switches a data transmission path to the final handed-over-to second base station.

Optionally, the preprocessing indication message further includes a correspondence between the SRB pre-configured by the second base station for the user terminal and an SRB that is maintained by the user terminal and the first base station, and/or a correspondence between the DRB pre-configured by the second base station for the user terminal and a DRB that is maintained by the user terminal and the first base station.

According to a fifth aspect, an embodiment of the present disclosure further provides a network side device, where the device is a second base station and includes:

a receiving unit, configured to receive a first request message sent by a first base station, where the first request message includes an identifier of a user terminal and indication information indicating that the user terminal is to preprocess the second base station, and the preprocessing includes pre-handover of the user terminal to the second base station or pre-addition of the second base station, but does not include data transmission by using the second base station;

a processing unit, configured to perform admission control based on the first request message; and a sending unit, configured to send a first acknowledgment message to the first base station when the processing unit determines that the user terminal is allowed to perform preprocessing, where the receiving unit is further configured to receive an access request sent by the user terminal, and the processing unit is further configured to synchronize with the user terminal based on the access request; and the receiving unit is further configured to receive a first indication message sent by the first base station, and the processing unit is further configured to implement data transmission between the second base station and the user terminal based on the first indication message.

Optionally, the first request message further includes a configuration instruction for configuring information;

the processing unit is further configured to pre-configure an SRB and a DRB for the user terminal according to the configuration instruction; and the first acknowledgment message includes configuration information of the SRB and configuration information of the DRB.

Optionally, the processing unit is configured to: after the receiving unit receives the first indication message sent by the first base station, establish the SRB and the DRB between the second base station and the user terminal based on the first indication message, and the configuration information of the SRB and the configuration information of the DRB that have been locally stored in the second base station; and the sending unit is further configured to send a path switching message to an MME, so that the MME switches a data transmission path to the second base station based on the received path switching message.

Optionally, the sending unit is configured to: after the receiving unit receives the first indication message sent by the first base station, send a second acknowledgment message to the first base station, where the second acknowledgment message includes SRB configuration information and DRB configuration information that are pre-configured by the second base station for the user terminal;

the processing unit is configured to establish an SRB and a DRB between the second base station and the user terminal based on the first indication message and the SRB configuration information and the DRB configuration information; and the sending unit is further configured to send a path switching message to an MME, so that the MME switches a data transmission path to the second base station based on the received path switching message.

Optionally, the first indication message includes a first intermediate key between the second base station and the user terminal produced by the first base station for the second base station, and indication information indicating that the user terminal is to produce, based on the first intermediate key, a final key between the user terminal and the second base station, and encrypt the transmitted data based on the final key.

Optionally, the receiving unit is further configured to receive first data sent by the first base station, where the first data is data that the first base station has not sent to the user terminal yet.

Optionally, the processing unit is further configured to:

produce a second intermediate key between the second base station and the user terminal based on the first intermediate key of the user terminal in the first base station and a first counter value pre-configured by the first base station for the user terminal, and produce a first final key between the second base station and the user terminal based on the second intermediate key, where the first final key is used to encrypt data transmitted by the second base station to the user terminal;

the receiving unit is further configured to receive a key update request message sent by the first base station;

the processing unit is further configured to: produce a third intermediate key by using the first intermediate key of the user terminal in the first base station and a second counter value pre-configured by the second base station for the user terminal; and add the third intermediate key to a key update response message and send the key update response message to the first base station, where the second counter value is different from the first counter value; and the sending unit is further configured to: send a first-base-station key update command to the user terminal, where the first-base-station key update command carries the second counter value, so that the user terminal produces the third intermediate key in the first base station based on the first intermediate key and the second counter value, and produces a second final key between the user terminal and the first base station based on the third intermediate key, where the second final key is used to encrypt data transmitted by the user terminal to the first base station.

Optionally, the processing unit is further configured to: produce a fifth intermediate key between the second base station and the user terminal based on a fourth intermediate key of the user terminal in the first base station and a third counter value pre-configured by the first base station for the user terminal, and produce a third final key between the second base station and the user terminal based on the fifth intermediate key, where the third final key is used to encrypt data transmitted by the second base station to the user terminal;

the receiving unit is further configured to receive a key update request sent by the first base station;

the processing unit is further configured to: produce a sixth intermediate key by using the fifth intermediate key of the user terminal in the second base station and the third counter value; and add the sixth intermediate key to a key update response message and send the key update response message to the first base station; and the sending unit is further configured to: send a key update command to the user terminal, where the key update command carries the fifth intermediate key and the third counter value, so that the user terminal produces the sixth intermediate key in the first base station based on the fifth intermediate key and the third counter value, and produces a fourth final key between the user terminal and the first base station based on the sixth intermediate key, where the fourth final key is used to encrypt data transmitted by the user terminal to the second base station.

According to a sixth aspect, an embodiment of the present disclosure further provides a user terminal, including:

a sending unit, configured to send a first measurement report to a first base station, so that the first base station determines, based on the first measurement report, a second base station that the user terminal is to preprocess, where the preprocessing includes pre-handover to or pre-addition of the second base station, but does not include data transmission by using the second base station, the user terminal is connected to the first base station by using a first component carrier, and the first measurement report includes signal quality information of a current serving cell and signal quality information of a neighboring cell of the current serving cell;

a receiving unit, configured to receive a preprocessing indication message sent by the first base station, where the preprocessing indication message includes information about a second component carrier on which the user terminal performs uplink synchronization with the second base station when performing the preprocessing, and the second component carrier is different from the first component carrier, where the sending unit is further configured to send, based on the preprocessing indication message, a random access request to the second base station on the second component carrier, to implement the preprocessing on the second base station; and the receiving unit is further configured to receive a second indication message sent by the first base station; and a processing unit, configured to implement data transmission between the user terminal and the second base station based on the second indication message.

Optionally, the preprocessing indication message further includes SRB configuration information and DRB configuration information that are pre-configured by the second base station for the user terminal; and the processing unit is configured to: after the receiving unit receives the second indication message sent by the first base station, establish an SRB and a DRB between the user terminal and the second base station based on the SRB configuration information and the DRB configuration information, to implement data transmission with the second base station.

Optionally, the second indication message further includes SRB configuration information and DRB configuration information that are pre-configured by the second base station for the user terminal; and the processing unit is configured to: after the receiving unit receives the second indication message sent by the first base station, establish an SRB and a DRB between the user terminal and the second base station based on the SRB configuration information and the DRB configuration information in the second indication message, to implement data transmission with the second base station.

Optionally, the processing unit is further configured to: produce a second intermediate key of the user terminal in the second base station based on a first intermediate key of the user terminal in the first base station and a first counter value pre-configured by the first base station for the user terminal, and produce a first final key of the user terminal in the second base station based on the second intermediate key, where the first final key is used to encrypt data transmitted by the user terminal to the second base station;

the receiving unit is further configured to receive a first-base-station key update command sent by the second base station, where the first-base-station key update command includes a second counter value pre-configured by the second base station for the user terminal, and the second counter value is different from the first counter value; and the processing unit is further configured to: produce a third intermediate key of the user terminal in the first base station based on the first intermediate key and the second counter value, and produce a second final key of the user terminal in the first base station based on the third intermediate key, where the second final key is used to encrypt data transmitted by the user terminal to the first base station.

Optionally, the processing unit is further configured to: produce a fifth intermediate key of the user terminal in the second base station based on a fourth intermediate key in the first base station and a third counter value pre-configured by the first base station for the user terminal, and produce a third final key of the user terminal in the second base station based on the fifth intermediate key, where the third final key is used to encrypt data transmitted by the user terminal to the second base station;

the receiving unit is further configured to receive a first-base-station key update command sent by the second base station, where the first-base-station key update command includes the fifth intermediate key and the third counter value; and the processing unit is further configured to: produce a sixth intermediate key in the first base station based on the fifth intermediate key and the third counter value, and produce a fourth final key between the second base station and the user terminal based on the sixth intermediate key, where the fourth final key is used to encrypt data transmitted by the user terminal to the second base station.

Optionally, the preprocessing indication message further includes indication information for instructing the user terminal to preprocess the second base station; and the processing unit is further configured to determine, based on the indication information, to maintain a connection between the user terminal and the first base station.

According to a seventh aspect, an embodiment of the present disclosure further provides a network side device, where the device is a first base station and includes:

a processor, configured to determine, based on a first measurement report received by the first base station and sent by a user terminal, a second base station that the user terminal is to preprocess, where the preprocessing includes pre-handover to or pre-addition of the second base station, but does not include data transmission by using the second base station, the first base station is connected to the user terminal by using a first component carrier, and the first measurement report includes signal quality information of a current serving cell and signal quality information of a neighboring cell of the current serving cell; and a transmitter, configured to send a first request message to the second base station, where the first request message includes indication information indicating that the user terminal is to preprocess the second base station, where the processor is further configured to: when the first base station receives a first acknowledgment message returned by the second base station, determine that the user terminal is capable of preprocessing the second base station;

the transmitter is further configured to send a preprocessing indication message to the user terminal, where the preprocessing indication message includes information about a second component carrier on which the user terminal performs uplink synchronization with the second base station when performing the preprocessing, and the second component carrier is different from the first component carrier;

the processor is further configured to obtain information about a target second base station with which the user terminal is to perform data transmission; and the transmitter is further configured to send a first indication message to the target second base station, or send the first indication message to the target second base station and a second indication message to the user terminal, to instruct the user terminal to be handed over to the target second base station for data transmission, or to instruct the user terminal to add the target second base station for data transmission.

Optionally, the first measurement report includes a first measurement result corresponding to the current serving cell and a second measurement result corresponding to the neighboring cell of the current serving cell; and the processor is configured to: determine, based on the received first measurement report sent by the user terminal, the second base station that the user terminal is capable of preprocessing; and if the first measurement result is less than a first threshold, determine, based on the second measurement result, at least one second base station corresponding to the second measurement result as the second base station that the user terminal is to preprocess, where the second measurement result is greater than the first measurement result.

Optionally, the device further includes:

a receiver, where the receiver is configured to receive a third indication message sent by the user terminal, the third indication message carries an identifier of the target second base station, the target second base station is determined by the user terminal based on a second measurement report, and the second measurement report includes signal quality information of the current serving cell and is different from the first measurement report; and the transmitter is configured to: when the receiver receives the third indication message, send the first indication message to the target second base station; or the processor is configured to determine the target second base station based on a second measurement report sent by the user terminal, and the transmitter is configured to send the first indication message to the target second base station and the second indication message to the user terminal.

Optionally, the first request message further includes a configuration instruction for configuring information, so that the second base station pre-configures an SRB and a DRB for the user terminal according to the configuration instruction; and both the first acknowledgment message and the preprocessing indication message include configuration information of the SRB and configuration information of the DRB.

Optionally, the receiver is configured to: after the transmitter sends the first indication message to the target second base station, receive a second acknowledgment message returned by the target second base station, where the second acknowledgment message includes SRB configuration information and DRB configuration information that are pre-configured by the target second base station for the user terminal; and the transmitter is specifically configured to send, to the user terminal, the second indication message that carries the SRB configuration information and the DRB configuration information.

Optionally, the first request message further includes indication information for instructing the second base station to establish an SRB, and establish a DRB or pre-configure configuration information of a DRB for the user terminal;

both the first acknowledgment message and the preprocessing indication message include information about the established SRB, and information about the established DRB or the configuration information of the DRB; and when the preprocessing indication message includes the information about the established SRB and the configuration information of the DRB, the preprocessing indication message further includes indication information indicating that the second base station has established, based on the configuration information of the DRB, the DRB for the user terminal.

Optionally, the first indication message includes a first intermediate key between the second base station and the user terminal produced by the first base station for the second base station, and information for instructing the user terminal to produce the first intermediate key between the user terminal and the target second base station based on a second intermediate key between the user terminal and the first base station, and produce a final key between the user terminal and the second base station based on the first intermediate key, where the final key is used to encrypt data transmitted by the user terminal to the second base station.

Optionally, the preprocessing indication message includes:

security key information between the user terminal and the second base station pre-configured by the first base station for the user terminal, so that when receiving the second indication message, the user terminal produces the first intermediate key between the user terminal and the second base station by using the second intermediate key between the user terminal and the first base station and the security key information.

Optionally, the preprocessing indication message includes second-base-station security algorithm information pre-configured by the first base station for the user terminal; and the second indication message sent by the first base station to the user terminal includes security key counter information pre-configured by the first base station for the user terminal, so that when receiving the second indication message, the user terminal produces the first intermediate key between the user terminal and the second base station by using the second intermediate key between the user terminal and the first base station, the second-base-station security algorithm information, and the security key counter information.

Optionally, the transmitter is further configured to send first data to the target second base station, where the first data is data that the first base station has not sent to the user terminal yet.

Optionally, the transmitter is further configured to send a path switching message to an MME, so that the MME switches a data transmission path to the final handed-over-to second base station.

Optionally, the preprocessing indication message further includes a correspondence between the SRB pre-configured by the second base station for the user terminal and an SRB that is maintained by the user terminal and the first base station, and/or a correspondence between the DRB pre-configured by the second base station for the user terminal and a DRB that is maintained by the user terminal and the first base station.

According to an eighth aspect, an embodiment of the present disclosure further provides a network side device, where the device is a second base station and includes:

a receiver, configured to receive a first request message sent by a first base station, where the first request message includes an identifier of a user terminal and indication information indicating that the user terminal is to preprocess the second base station, and the preprocessing includes pre-handover of the user terminal to the second base station or pre-addition of the second base station, but does not include data transmission by using the second base station;

a processor, configured to perform admission control based on the first request message; and a transmitter, configured to send a first acknowledgment message to the first base station when the processor determines that the user terminal is allowed to perform preprocessing, where the receiver is further configured to receive an access request sent by the user terminal, and the processor is further configured to synchronize with the user terminal based on the access request; and the receiver is further configured to receive a first indication message sent by the first base station, and the processor is further configured to implement data transmission between the second base station and the user terminal based on the first indication message.

Optionally, the first request message further includes a configuration instruction for configuring information;

the processor is further configured to pre-configure an SRB and a DRB for the user terminal according to the configuration instruction; and the first acknowledgment message includes configuration information of the SRB and configuration information of the DRB.

Optionally, the processor is configured to: after the receiver receives the first indication message sent by the first base station, establish the SRB and the DRB between the second base station and the user terminal based on the first indication message, and the configuration information of the SRB and the configuration information of the DRB that have been locally stored in the second base station; and the transmitter is further configured to send a path switching message to an MME, so that the MME switches a data transmission path to the second base station based on the received path switching message.

Optionally, the transmitter is configured to: after the receiver receives the first indication message sent by the first base station, send a second acknowledgment message to the first base station, where the second acknowledgment message includes SRB configuration information and DRB configuration information that are pre-configured by the second base station for the user terminal;

the processor is configured to establish an SRB and a DRB between the second base station and the user terminal based on the first indication message and the SRB configuration information and the DRB configuration information; and the transmitter is further configured to send a path switching message to an MME, so that the MME switches a data transmission path to the second base station based on the received path switching message.

Optionally, the first indication message includes a first intermediate key between the second base station and the user terminal produced by the first base station for the second base station, and indication information indicating that the user terminal is to produce, based on the first intermediate key, a final key between the user terminal and the second base station, and encrypt the transmitted data based on the final key.

Optionally, the receiver is further configured to receive first data sent by the first base station, where the first data is data that the first base station has not sent to the user terminal yet.

Optionally, the processor is further configured to:

produce a second intermediate key between the second base station and the user terminal based on the first intermediate key of the user terminal in the first base station and a first counter value pre-configured by the first base station for the user terminal, and produce a first final key between the second base station and the user terminal based on the second intermediate key, where the first final key is used to encrypt data transmitted by the second base station to the user terminal;

the receiver is further configured to receive a key update request message sent by the first base station;

the processor is further configured to: produce a third intermediate key by using the first intermediate key of the user terminal in the first base station and a second counter value pre-configured by the second base station for the user terminal; and add the third intermediate key to a key update response message and send the key update response message to the first base station, where the second counter value is different from the first counter value; and the transmitter is further configured to: send a first-base-station key update command to the user terminal, where the first-base-station key update command carries the second counter value, so that the user terminal produces the third intermediate key in the first base station based on the first intermediate key and the second counter value, and produces a second final key between the user terminal and the first base station based on the third intermediate key, where the second final key is used to encrypt data transmitted by the user terminal to the first base station.

Optionally, the processor is further configured to: produce a fifth intermediate key between the second base station and the user terminal based on a fourth intermediate key of the user terminal in the first base station and a third counter value pre-configured by the first base station for the user terminal, and produce a third final key between the second base station and the user terminal based on the fifth intermediate key, where the third final key is used to encrypt data transmitted by the second base station to the user terminal;

the receiver is further configured to receive a key update request sent by the first base station;

the processor is further configured to: produce a sixth intermediate key by using the fifth intermediate key of the user terminal in the second base station and the third counter value; and add the sixth intermediate key to a key update response message and send the key update response message to the first base station; and the transmitter is further configured to: send a key update command to the user terminal, where the key update command carries the fifth intermediate key and the third counter value, so that the user terminal produces the sixth intermediate key in the first base station based on the fifth intermediate key and the third counter value, and produces a fourth final key between the user terminal and the first base station based on the sixth intermediate key, where the fourth final key is used to encrypt data transmitted by the user terminal to the second base station.

According to a ninth aspect, an embodiment of the present disclosure further provides a user terminal, including:

a transmitter, configured to send a first measurement report to a first base station, so that the first base station determines, based on the first measurement report, a second base station that the user terminal is to preprocess, where the preprocessing includes pre-handover to or pre-addition of the second base station, but does not include data transmission by using the second base station, the user terminal is connected to the first base station by using a first component carrier, and the first measurement report includes signal quality information of a current serving cell and signal quality information of a neighboring cell of the current serving cell;

a receiver, configured to receive a preprocessing indication message sent by the first base station, where the preprocessing indication message includes information about a second component carrier on which the user terminal performs uplink synchronization with the second base station when performing the preprocessing, and the second component carrier is different from the first component carrier, where the transmitter is further configured to send, based on the preprocessing indication message, a random access request to the second base station on the second component carrier, to implement the preprocessing on the second base station; and the receiver is further configured to receive a second indication message sent by the first base station; and a processor, configured to implement data transmission between the user terminal and the second base station based on the second indication message.

Optionally, the preprocessing indication message further includes SRB configuration information and DRB configuration information that are pre-configured by the second base station for the user terminal; and the processor is configured to: after the receiver receives the second indication message sent by the first base station, establish an SRB and a DRB between the user terminal and the second base station based on the SRB configuration information and the DRB configuration information, to implement data transmission with the second base station.

Optionally, the second indication message further includes SRB configuration information and DRB configuration information that are pre-configured by the second base station for the user terminal; and the processor is configured to: after the receiver receives the second indication message sent by the first base station, establish an SRB and a DRB between the user terminal and the second base station based on the SRB configuration information and the DRB configuration information in the second indication message, to implement data transmission with the second base station.

Optionally, the processor is further configured to: produce a second intermediate key of the user terminal in the second base station based on a first intermediate key of the user terminal in the first base station and a first counter value pre-configured by the first base station for the user terminal, and produce a first final key of the user terminal in the second base station based on the second intermediate key, where the first final key is used to encrypt data transmitted by the user terminal to the second base station;

the receiver is further configured to receive a first-base-station key update command sent by the second base station, where the first-base-station key update command includes a second counter value pre-configured by the second base station for the user terminal, and the second counter value is different from the first counter value; and the processor is further configured to: produce a third intermediate key of the user terminal in the first base station based on the first intermediate key and the second counter value, and produce a second final key of the user terminal in the first base station based on the third intermediate key, where the second final key is used to encrypt data transmitted by the user terminal to the first base station.

Optionally, the processor is further configured to: produce a fifth intermediate key of the user terminal in the second base station based on a fourth intermediate key in the first base station and a third counter value pre-configured by the first base station for the user terminal, and produce a third final key of the user terminal in the second base station based on the fifth intermediate key, where the third final key is used to encrypt data transmitted by the user terminal to the second base station;

the receiver is further configured to receive a first-base-station key update command sent by the second base station, where the first-base-station key update command includes the fifth intermediate key and the third counter value; and the processor is further configured to: produce a sixth intermediate key in the first base station based on the fifth intermediate key and the third counter value, and produce a fourth final key between second base station and the user terminal based on the sixth intermediate key, where the fourth final key is used to encrypt data transmitted by the user terminal to the second base station.

Optionally, the preprocessing indication message further includes indication information for instructing the user terminal to preprocess the second base station; and the processor is further configured to determine, based on the indication information, to maintain a connection between the user terminal and the first base station.

According to a tenth aspect, an embodiment of the present disclosure further provides a communications system, including the network side devices and the user terminals in the foregoing various aspects.

According to the communication method, the network side device, the user terminal, and the communications system that are provided in the embodiments of the present disclosure, the user terminal is connected to the first base station by using the first component carrier; the first base station sends the preprocessing indication message to the user terminal, to indicate that the user terminal is to perform uplink synchronization with the second base station on the second component carrier; and when obtaining the target second base station with which the user terminal needs to perform data transmission, the first base station sends the first indication message to the target second base station, to instruct the target second base station to perform data transmission with the user terminal. Before the first base station sends the first indication message to the target second base station, to instruct the target second base station to perform data transmission with the user terminal, the user terminal has established uplink synchronization with the second base station by using the second component carrier while maintaining a connection to the first base station. Therefore, when the first base station sends the first indication message to the target second base station, to instruct to implement actual handover of the user terminal to the target second base station, the user terminal can be quickly handed over from the first base station to the second base station, so as to reduce a handover latency, and quickly implement data transmission with the second base station.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and persons of ordinary skill in the art may derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
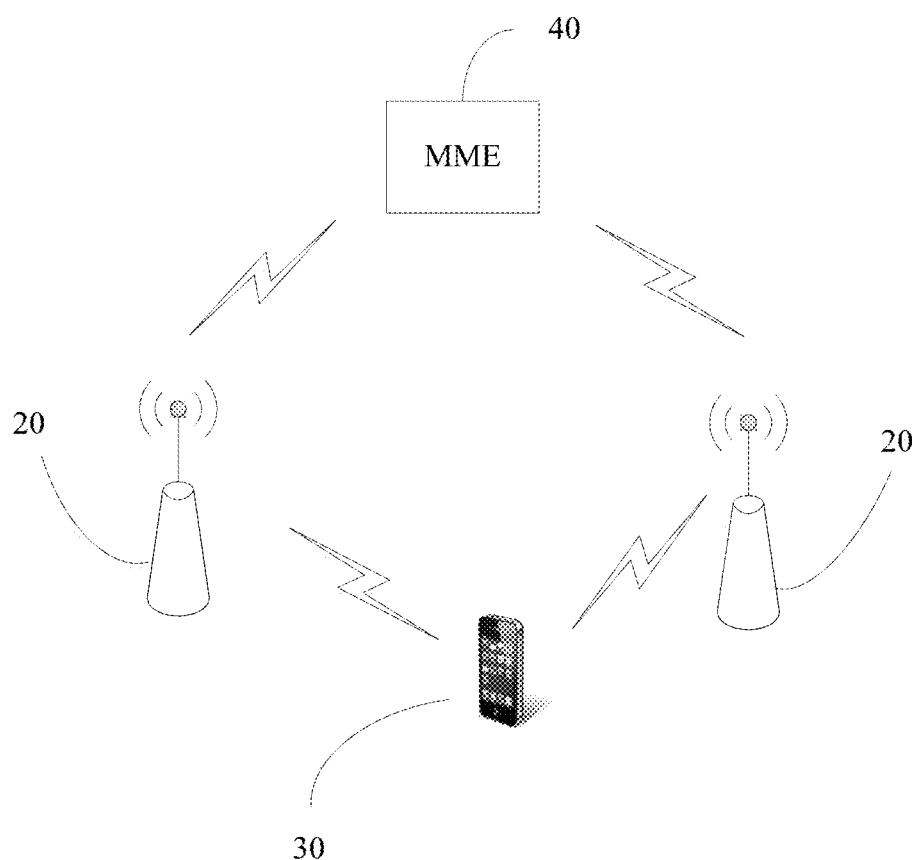
FIG. 1 is a schematic diagram of a structural framework of a communications system according to an embodiment of the present disclosure.

FIG. 1 is a schematic diagram of a structural framework of a communications system according to an embodiment of the present disclosure.

Referring to FIG. 1, the communications system based on base station mobility management includes a first base station 10, a second base station 20, a user equipment (UE) 30, and a mobility management entity (MME). The UE 30 is connected to the first base station 10 by using a first component carrier, and performs data transmission with the first base station 10. The UE is a UE that has a carrier aggregation (CA) or dual connectivity (DC) capability.

A communication method, a network side device, and a user terminal in the embodiments of the present disclosure are used to: when quality of a signal between the UE and the first base station decreases to an extent, implement handover of the UE from the first base station to the second base station, so that the UE performs data transmission with the second base station; or add a connection to the second base station, so as to implement primary/secondary switching between the first base station and the second base station, and data transmission between the UE and the second base station. According to the communication method, the network side device, and the user terminal in the embodiments of the present disclosure, before the UE is handed over to the second base station or adds the second base station for data transmission, the UE establishes uplink synchronization with the second base station in advance by using a second component carrier different from the first component carrier, but does not perform actual data transmission with the second base station. After the UE is actually handed over to the second base station or the second base station and the first base station complete primary/secondary switching, the UE implements data transmission with the second base station. Before handover to or addition of the second base station is actually implemented, the UE has completed uplink synchronization with the second base station and established the connection to the second base station. When handover is actually implemented, the UE can be quickly handed over from the first base station to the second base station, so as to reduce a handover latency and quickly implement data transmission with the second base station.

Figure 2:
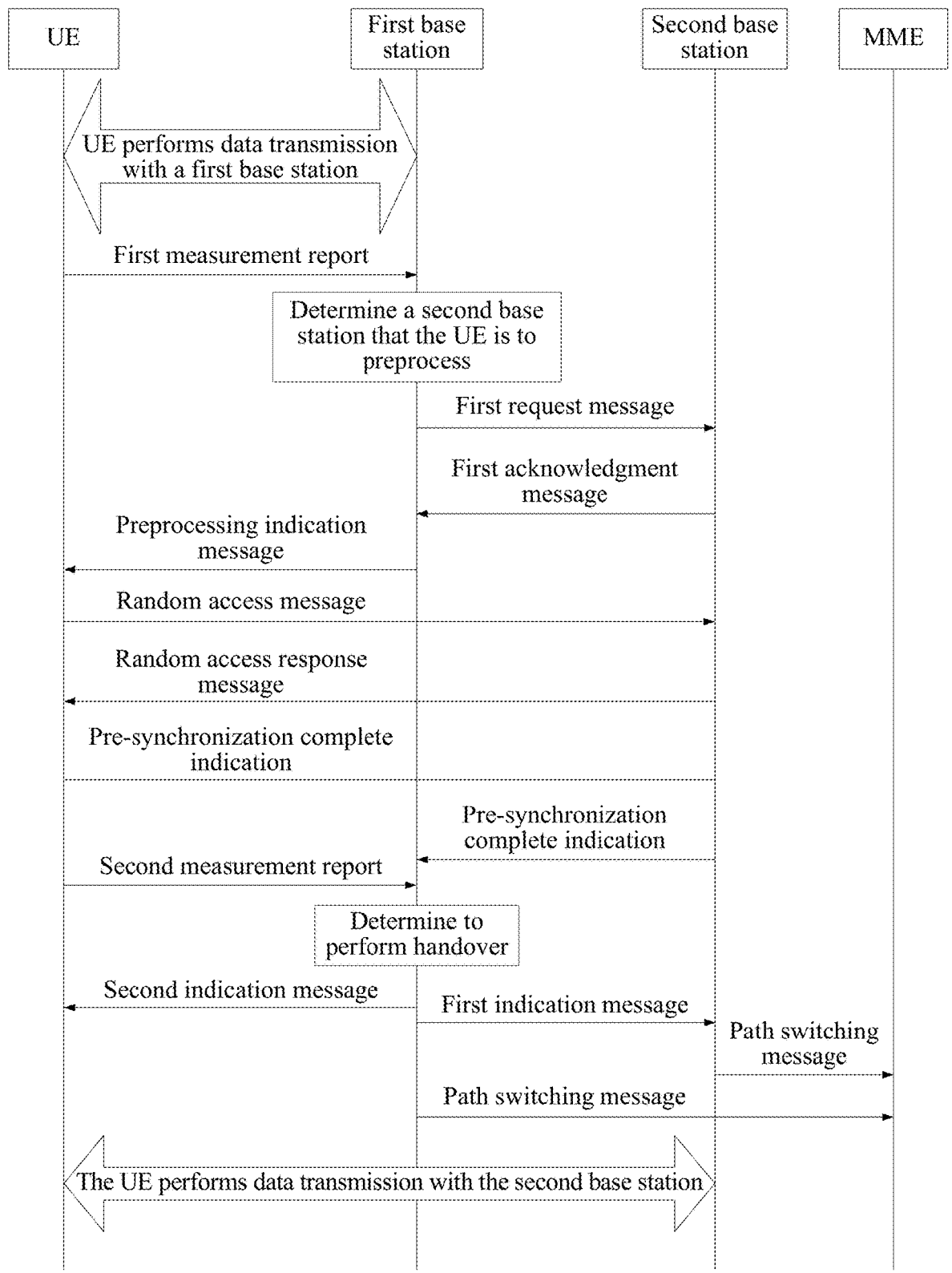
FIG. 2 is a schematic flowchart of a communication method according to an embodiment of the present disclosure.
Figure 3:
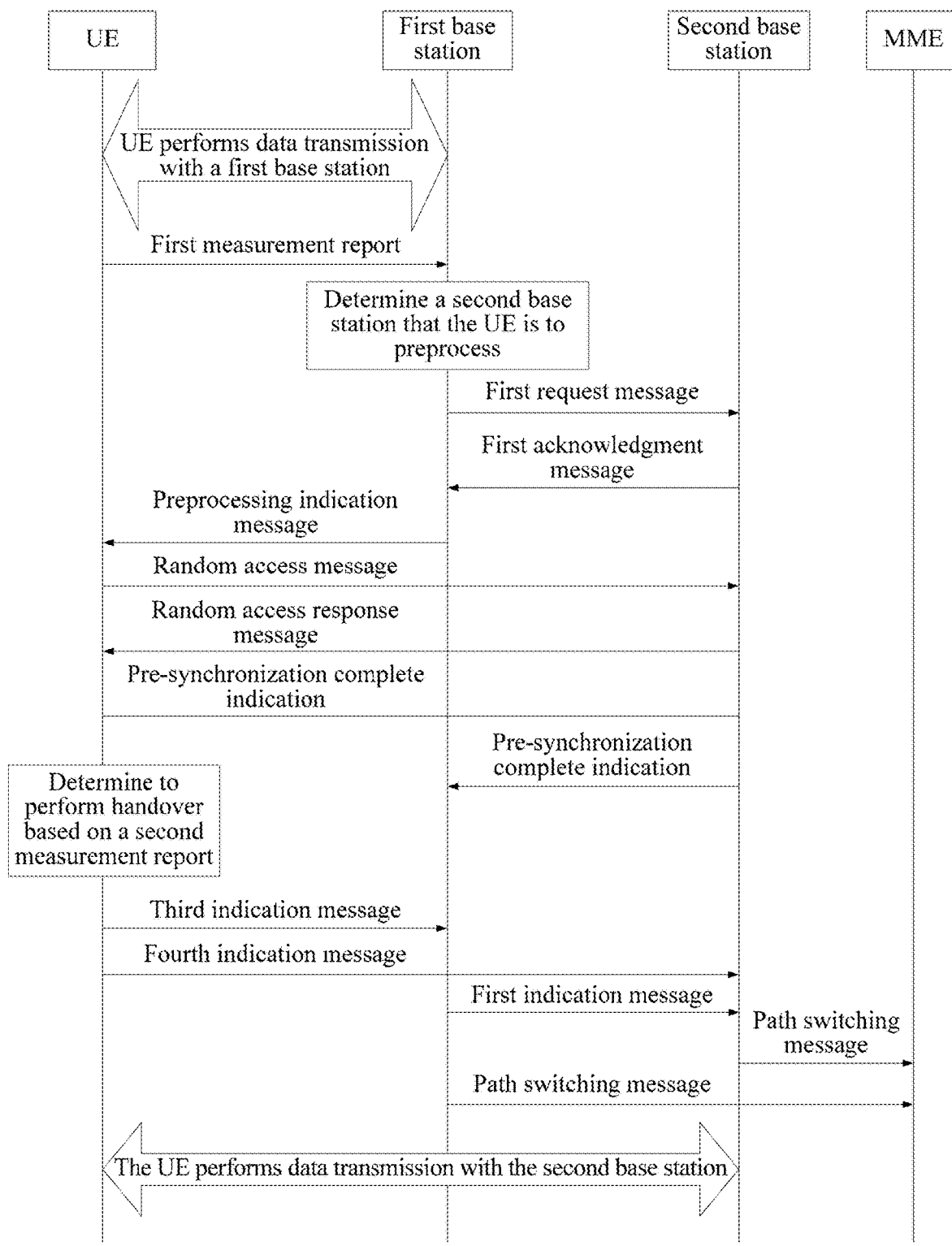
FIG. 3 is a schematic flowchart of a communication method according to another embodiment of the present disclosure.

FIG. 2 is a schematic flowchart of a communication method according to an embodiment of the present disclosure. FIG. 3 is a schematic flowchart of a communication method according to another embodiment of the present disclosure.

Referring to FIG. 2 and FIG. 3, the communication methods in the embodiments of the present disclosure include the following steps.

S101: A UE sends a first measurement report to a first base station, so that the first base station determines, based on the first measurement report, a second base station that the UE is to preprocess, where the preprocessing includes pre-handover to or pre-addition of the second base station, but does not include data transmission by using the second base station, the UE is connected to the first base station by using a first component carrier, and the first measurement report includes signal quality information of a current serving cell and signal quality information of a neighboring cell of the current serving cell.

S102: The first base station determines, based on the received first measurement report sent by the UE, the second base station that the UE is to preprocess.

To be specific, the first measurement report includes a first measurement result corresponding to the current serving cell and a second measurement result corresponding to the neighboring cell of the current serving cell. The first measurement result may be signal strength of the current serving cell, and the second measurement result may be signal strength of the neighboring cell. Alternatively, the first measurement result and the second measurement result may be other parameters that can reflect signal quality of the current serving cell and the neighboring cell.

The determining, by the first base station based on the received first measurement report sent by the UE, the second base station that the UE is capable of preprocessing includes:

if the first measurement result is less than a first threshold, determining, by the first base station based on the second measurement result, at least one second base station corresponding to the second measurement result as the second base station that the UE is to preprocess, where the second measurement result is greater than the first measurement result.

To be specific, if the signal strength of the current serving cell is less than the first threshold, it indicates that the signal strength of the current serving cell is insufficient, and that the second base station that may be preprocessed needs to be determined. The first base station determines, from a neighboring cell whose signal strength is greater than that of the current serving cell, a base station corresponding to a neighboring cell of strongest signal strength as the second base station that the UE is to preprocess or determines a base station corresponding to a plurality of neighboring cells of relatively strong signal strength as the second base station that the UE is to preprocess.

S103: The first base station sends a first request message to the second base station, where the first request message includes an identifier of the UE and indication information indicating that the UE is to preprocess the second base station.

To be specific, the indication information indicating that the UE is to preprocess the second base station is used to notify the second base station that the UE is to establish uplink synchronization with the second base station.

S104: The second base station receives the first request message sent by the first base station, performs admission control based on the first request message, and returns a first acknowledgment message to the first base station when determining that the UE is allowed to perform preprocessing.

S105: The first base station determines, when receiving the first acknowledgment message returned by the second base station, that the UE is capable of preprocessing the second base station, and sends a preprocessing indication message to the UE, where the preprocessing indication message includes information about a second component carrier on which the UE performs uplink synchronization with the second base station when performing the preprocessing, and the second component carrier is different from the first component carrier.

The preprocessing indication message includes information (such as an identifier) about one or more second base stations on which pre-handover is to be performed, and information about component carriers used for uplink synchronization during pre-handover of the UE to the one or more second base stations, that is, the information about the second component carrier.

S106: The UE receives the preprocessing indication message sent by the first base station, and sends, based on the preprocessing indication message, a random access request to the second base station on the second component carrier, to implement the preprocessing on the second base station.

The preprocessing indication message further includes indication information for instructing the UE to preprocess the second base station. The UE determines, based on the indication information, to maintain a connection to the first base station.

To be specific, the preprocessing indication message is used to instruct the UE to perform uplink synchronization with the second base station while maintaining the connection to the first base station, to establish a connection to the second base station but not to perform data transmission with the second base station.

S107: The second base station receives the random access request sent by the UE, and synchronizes with the UE based on the random access request.

To be specific, the UE performs a random access procedure with the corresponding second base station on a component carrier notified in a handover command, and sends a random access preamble to request for synchronization with the second base station. Herein, the random access preamble may be a common random access preamble, for pre-handover, negotiated by the first base station and the one or more second base stations.

The UE receives a random access response message sent by the second base station. The random access response message contains uplink timing advance information, and further includes information about a UL resource allocated to the UE.

The UE sends a pre-synchronization complete indication message to the second base station by using the allocated uplink resource, to indicate that the pre-synchronization process is completed. The pre-handover complete message contains identifier information of the UE. Then, after determining that the UE finishes pre-handover, the second base station sends a pre-handover complete indication to the first base station.

Alternatively, after determining that pre-handover is completed, the UE may send a pre-handover complete indication to the first base station. Then, the first base station may also send, to the second base station, an indication that the UE finishes pre-handover.

Alternatively, the UE may send a pre-handover complete indication to both the first base station and the second base station.

It should be noted that, when the UE needs to perform pre-synchronization with a plurality of second base stations, the UE may perform pre-synchronization at different time or simultaneously. When uplink carriers simultaneously supported by the UE are insufficient, the UE may perform pre-handover to or pre-addition of the plurality of second base stations at different time. If uplink carriers simultaneously supported by the UE are sufficient, the UE may simultaneously perform pre-handover to or pre-addition of the plurality of second base stations. In addition, specific time patterns used by the UE for handover at different time may be configured by the first base station for the UE in the preprocessing indication message.

In addition, in preparation of pre-handover or pre-addition, if the UE currently performs communication on a plurality of component carriers, and has no idle component carrier or no spare capability for pre-handover to or pre-addition of the second base station, in the handover command, the first base station may instruct the UE to suspend communication on one or more specified component carriers and to perform pre-handover to or pre-addition of the second base station first.

S108. The first base station obtains information about a target second base station with which the UE is to perform data transmission.

After completing the preprocessing, the UE may send an uplink synchronization maintenance signal such as an SRS signal to the second base station based on a period (the period may be configured by the first base station or the second base station for the UE in the preprocessing indication message) or an event (for example, the quality of a signal between the UE and the first base station is lower than a specified threshold), to maintain uplink synchronization with the second base station. When the UE cannot maintain uplink synchronization with the second base station, the UE reports, to the first base station, indication information indicating that the UE and the second base station are out of uplink synchronization. In addition, the UE continues to send a second measurement report to the first base station based on a period or an event. The second measurement report includes signal quality information of the current serving cell and is different from the first measurement report.

To be specific, when the signal quality of the current serving cell in the second measurement report is lower than a second threshold, the UE needs to be handed over to the second base station for data transmission or add the second base station for data transmission.

The first base station may obtain, in the following manners, the information about the target second base station with which the UE is to perform data transmission:

In an implementation, the first base station receives the second measurement report sent by the UE, determines, based on the second measurement report sent by the UE, that the UE needs to be handed over to the second base station or add the second base station, and determines the target second base station with which the UE is to perform data transmission. If there are a plurality of second base stations that the UE is to preprocess, a second base station of best signal quality is determined from the plurality of second base stations as the target second base station.

In another implementation, the UE determines, based on the second measurement report, that handover to or addition of the second base station is required, and determines the target second base station with which the UE is to perform data transmission. If there are a plurality of second base stations that the UE is to preprocess, the UE determines a second base station of best signal quality from the plurality of second base stations as the target second base station, and sends the information about the target second base station to the first base station.

S109: The first base station sends a first indication message to the target second base station, or sends the first indication message to the target second base station and a second indication message to the UE, to instruct the UE to be handed over to the target second base station for data transmission, or to instruct the UE to add the target second base station for data transmission.

To be specific, according to one implementation of obtaining the target second base station, the UE may determine the target second base station based on the second measurement report. The first base station receives a third indication message sent by the UE, and the third indication message carries an identifier of the target second base station. The first base station sends the first indication message to the target second base station, to indicate that the UE is to be handed over from the first base station to the target second base station. In addition, the UE may alternatively send a fourth indication message to the target second base station, to notify the target second base station that the UE is to be handed over to the target second base station or is to add the target second base station for data transmission.

Alternatively, according to the other implementation of obtaining the target second base station, the first base station determines the target second base station based on a second measurement report sent by the UE, and sends the first indication message to the target second base station and the second indication message to the UE.

S110: The second base station receives the first indication message sent by the first base station, and implements data transmission with the UE based on the first indication message.

S111: The UE receives the second indication message sent by the first base station, and implements data transmission between the UE and the second base station based on the second indication message.

To be specific, data transmission between the UE and the second base station may be implemented in, but not limited to, the following manners.

In an implementation, the first request message sent by the first base station to the second base station includes a configuration instruction for configuring information, so that the second base station pre-configures a signaling radio bearer (SRB) and a data radio bearer (DRB) for the UE according to the configuration instruction.

To support a process in which the second base station establishes an SRB, and configures or establishes a DRB for the UE, the first base station may notify, for reference, the second base station of configuration information of an SRB and a DRB that are between the UE and the first base station.

After receiving the first request message, the second base station establishes an SRB, and configures or establishes a DRB for the UE if determining that the UE is allowed to perform the preprocessing. In this case, both the first acknowledgment message and the preprocessing indication message include configuration information of the SRB and configuration information of the DRB.

After receiving the first indication message, the second base station first establishes the SRB and the DRB between the second base station and the UE. To be specific, the establishing the SRB and the DRB between the second base station and the UE includes: establishing corresponding L2 entities such as a Packet Data Convergence Protocol (PDCP) entity, a radio link control (RLC) entity, and a Media Access Control (MAC) entity for the SRB, and establishing a corresponding PDCP entity, RLC entity, and MAC entity for the DRB. Then, by using the established PDCP entities, RLC entities, and MAC entities, the second base station receives uplink data sent by the UE and sends downlink data to the UE.

Then, the first base station forwards, to the target second base station, data that the first base station has not sent to the UE yet, and sends a path switching message to a mobility management entity (MME), so that the MME switches a data transmission path to the final handed-over-to or added second base station.

After receiving the second indication message, the UE first establishes the SRB and the DRB between the UE and the second base station by using the stored configuration information of the SRB and the DRB that is pre-configured by the second base station, to perform data transmission with the second base station. To be specific, the establishing the SRB and the DRB between the UE and the second base station includes: establishing corresponding L2 entities (for example, a PDCP entity, an RLC entity, and a MAC entity) for the SRB, and establishing a corresponding PDCP entity, RLC entity, and MAC entity for the DRB. Then, by using the established PDCP entities, RLC entities, and MAC entities, the UE receives downlink data transmitted by the second base station and sends uplink data to the second base station.

In another implementation, after sending the first indication message to the target second base station, the first base station receives a second acknowledgment message returned by the target second base station, where the second acknowledgment message includes SRB configuration information and DRB configuration information that are pre-configured by the target second base station for the UE; and the first base station sends, to the UE, the second indication message that carries the SRB configuration information and the DRB configuration information.

Optionally, the second indication message may further include a key update parameter such as a key update counter.

When the first base station determines, based on the second measurement report, that the UE is to be handed over to the second base station or is to add the second base station for data transmission, the first base station sends a path switching message to an MME, so that the MME switches a data transmission path to the second base station. Alternatively, after receiving the first indication information sent by the first base station, the second base station may send a path switching message to an MME.

After receiving the second indication message, the UE performs key update, and first establishes an SRB and a DRB between the UE and the second base station by using the SRB configuration information and the DRB configuration information that are pre-configured by the second base station, to perform data transmission with the second base station.

To be specific, the first indication message sent by the first base station to the second base station further includes a first intermediate key between the second base station and the UE produced by the first base station for the second base station. After receiving the second indication message sent by the first base station, the UE produces the first intermediate key between the UE and the target second base station based on a second intermediate key between the UE and the first base station, and then produces a final key between the UE and the second base station, where the final key is used to encrypt data transmitted by the UE to the second base station.

In another implementation, the first request message sent by the first base station to the second base station further includes indication information for instructing the second base station to establish an SRB, and establish a DRB or pre-configure configuration information of a DRB for the UE;

both the first acknowledgment message sent by the second base station to the first base station and the preprocessing indication message sent by the first base station to the UE include information about the established SRB, and information about the established DRB or the configuration information of the DRB; and the preprocessing indication message sent by the first base station to the UE further includes indication information indicating that the second base station has established, based on the configuration information of the DRB, the DRB for the UE.

To be specific, after receiving the first request message, the second base station performs admission control. If determining that the UE is allowed to perform preprocessing, the second base station sends the first acknowledgment message to the first base station, and establishes the SRB, and configures or establishes the DRB for the UE. In addition, the first acknowledgment message further includes indication information of a primary cell on an RRC connection between the UE and the second base station. For ease of description, an RRC connection between the UE and the first base station is referred to as a first RRC connection, and a primary cell on the first RRC connection is referred to as a first primary cell. A connection established between the UE and the second base station (that is, the established SRB) is referred to as a second RRC connection, and a primary cell on the second RRC connection is referred to as a second primary cell.

The first base station sends the preprocessing indication message to the UE. The preprocessing indication message includes indication information for instructing the UE to perform only preprocessing, or indication information for instructing the UE to establish the second RRC connection, or indication information for instructing the UE to establish a deactivated second RRC connection, or indication information for instructing the UE to establish a deactivated SRB between the UE and the second base station. The preprocessing indication message further includes indication information of the second primary cell on the second RRC connection, and information about a physical uplink control channel (PUCCH) resource configured for the second primary cell.

The first base station sends the preprocessing indication message to the UE, so that the UE determines whether to be actually handed over to the second base station or add the second base station for data transmission, or perform only preprocessing, that is, not to immediately perform data transmission but only to establish the SRB, and configure or establish the DRB for the second base station, or set the established SRB and DRB to be in a deactivated state, and is uplink synchronized with the second base station.

If the preprocessing indication message instructs the UE to pre-add the second base station for data transmission, that is, establish the second RRC connection to the second base station, the UE establishes the second RRC connection to the second base station, and maintains the second RRC connection. To be specific, the maintaining the second RRC connection includes: performing downlink listening on the second RRC connection to determine whether a radio link failure may occur on the second RRC connection, and reporting a radio link failure when the radio link failure occurs on the second RRC connection, to release the second RRC connection.

When determining that handover to the target second base station or addition of the second base station actually needs to be performed, the first base station sends the first indication message to the target second base station, to instruct the second base station to prepare to perform data transmission with the UE. After receiving a quick handover command, the second base station activates the SRB and the DRB between the second base station and the UE for data transmission.

Then, the first base station may forward, to the second base station, data that has not been sent to the UE yet. After receiving a quick handover indication, the second base station may send a path switching message to an MME, so that the MME switches a data transmission path to the second base station.

After receiving the second indication message sent by the first base station, the UE starts to communicate with the second base station by using the established SRB and DRB between the UE and the second base station, that is, activates the SRB and DRB between the UE and the second base station for data transmission.

In another implementation, the communication method in this embodiment of the present disclosure is used to implement primary/secondary switching between the first base station and the second base station by using a dual connectivity mode. Before switching, the first base station is a primary base station, and the second base station is a secondary base station.

The first request message is used to notify the second base station that the UE is to establish uplink synchronization with the second base station, and requests the second base station to configure configuration information of an SRB and/or a DRB for the UE.

After receiving the first request message, the second base station performs admission control. If determining that the UE is allowed to perform preprocessing, the second base station sends the first acknowledgment message to the first base station, and pre-configures the configuration information of the SRB and/or the DRB for the UE.

In this case, the second base station may also establish corresponding PDCP entities, RLC entities, and MAC entities for the SRB and/or the DRB in advance.

In addition, when determining that switching actually needs to be performed, the first base station sends the first indication message to the second base station, to instruct the second base station to serve as the primary base station, and the first base station to serve as the secondary base station or release the first base station.

After receiving the first indication message, if an SRB and a DRB have been established, the second base station activates the SRB and the DRB between the second base station and the UE for data transmission. If only parameters of an SRB and a DRB are configured, the second base station establishes the SRB and the DRB between the second base station and the UE for data transmission.

In another implementation, the communication method in this embodiment of the present disclosure is still used to implement primary/secondary switching between the first base station and the second base station by using a dual connectivity mode. Before switching, the first base station is a primary base station, and the second base station is a secondary base station. A difference between this implementation and the foregoing implementation lies in that when communicating with the first base station, the UE establishes an actual dual connectivity to the second base station to perform data transmission with the second base station.

To be specific, the first request message sent by the first base station to the second base station includes indication information for pre-configuring an SRB for the UE, or indication information for pre-configuring a second RRC connection for the UE.

After receiving the first request message, the second base station performs admission control. If determining that the UE is allowed to pre-add the second base station, the second base station sends the first acknowledgment message to the first base station, and pre-configures the SRB for the UE and establishes a DRB for the UE.

The first base station sends the preprocessing indication message to the UE. The preprocessing indication message includes indication information for pre-configuring the SRB to the second base station and indication information for adding the DRB, so that the UE determines to establish the DRB between the UE and the second base station for data transmission, and pre-configure or pre-establish the SRB or the second RRC connection to the second base station.

After adding the second base station, the UE performs data transmission by using the established DRB between the UE and the second base station.

When the first base station determines, based on the measurement report sent by the UE, that primary base station switching needs to be performed for the UE, the first base station sends the second indication message to the UE, to instruct the UE to use the designated target second base station as a new primary base station, and use the first base station as a new secondary base station, or use the first base station as a new secondary base station and maintain the SRB between the UE and the second base station, or release the first base station. To be specific, the second indication message may be physical layer control signaling, MAC control signaling, or an RRC message.

In addition, when determining that switching actually needs to be performed, the first base station sends the first indication message to the second base station, to indicate indication information that the second base station is to serve as the new primary eNB and the first base station is to serve as the new secondary base station or is to be released.

After receiving the first indication message, if an SRB and a DRB have been established, the second base station activates the SRB and the DRB between the second base station and the UE for data transmission. If only parameters of an SRB and a DRB are configured, the second base station establishes the SRB and the DRB between the second base station and the UE for data transmission.

If the first base station is determined to be released, in this case, the first base station may start to forward, to the second base station, data that has not been sent to the UE yet. The second base station may send a path switching message to an MME, so that the MME switches a data transmission path to the second base station.

Alternatively, if the first base station serves as the new secondary base station, the UE may continue performing data transmission by using the DRB between the UE and the first base station.

After the second base station receives the first indication message, if only a parameter of the SRB between the UE and the second base station is pre-configured, and no L2 entity is established for the SRB, the UE establishes the SRB between the UE and the second base station by using stored configuration information of the SRB pre-configured to the second base station, that is, establishes an RRC connection to the second base station, in other words, the new primary eNB. Alternatively, if an SRB has been established to the second base station, the UE starts to transmit a control message to the second base station, in other words, the new primary eNB, by using the SRB.

Further, on the basis of the foregoing embodiments, the preprocessing indication message further includes a correspondence between the SRB pre-configured by the second base station for the UE and an SRB that is maintained by the UE and the first base station, and/or a correspondence between the DRB pre-configured by the second base station for the UE and a DRB that is maintained by the UE and the first base station. For example, an identifier X of the DRB pre-configured by the second base station is corresponding to an identifier Y of a DRB between the UE and the first base station. In this case, when the UE is actually handed over to the second base station or adds the second base station, data that is to be transmitted by using an SRB and the DRB of the first base station may be mapped onto the corresponding SRB and DRB pre-configured by the second base station for transmission. In addition, when the first base station forwards the data of the UE to the second base station, the correspondences also help to map the data that is to be transmitted by using the SRB and/or the DRB of the first base station onto the SRB and/or the DRB configured by the second base station for the UE.

Optionally, to avoid that after the UE adds the second base station and is handed over from the first base station to the second base station, a security key produced by the UE is not the same as that produced by the second base station, or security context information is not the matched, a security key needs to be specifically designed as follows.

On the basis of the foregoing embodiments, the preprocessing indication message includes security key information between the UE and the second base station pre-configured by the first base station for the UE.

To be specific, the security key information may include second-base-station security algorithm information and second-base-station security key counter information.

When receiving the second indication message, the UE produces the first intermediate key between the UE and the second base station by using the second intermediate key between the UE and the first base station and the security key information.

Alternatively, the preprocessing indication message includes second-base-station security algorithm information pre-configured by the first base station for the UE and does not include a second-base-station security key counter, and the second indication message sent by the first base station to the UE includes security key counter information pre-configured by the first base station for the UE.

When receiving the second indication message, the UE produces the first intermediate key between the UE and the second base station by using the second intermediate key between the UE and the first base station, the second-base-station security algorithm information, and the security key counter information.

Figure 4:
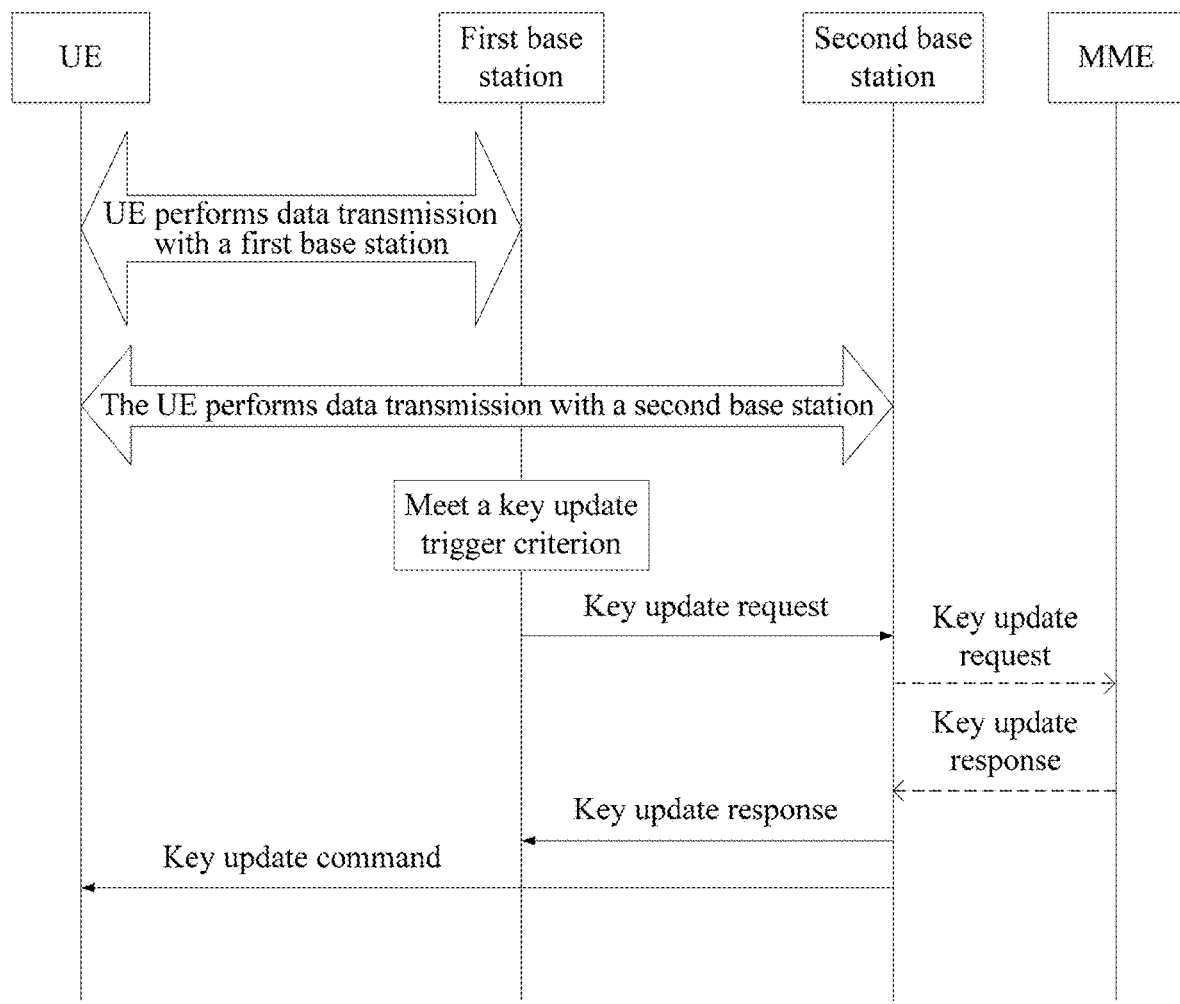
FIG. 4 is a schematic flowchart of key update of a communication method according to an embodiment of the present disclosure.

FIG. 4 is a schematic flowchart of key update of a communication method according to an embodiment of the present disclosure.

Referring to FIG. 4, further, when the UE establishes the connection to the second base station, the second base station serves as the primary base station, and the first base station becomes the secondary base station, because of some conditions of an original primary eNB (in other words, the new secondary base station), for example, a PDCP COUNT value is to be reversed, key update on the original primary eNB is triggered.

An intermediate key KeNB2 of a UE on a secondary base station is produced based on an intermediate key of the UE on an original primary eNB and a secondary-base-station counter configured by the original base station for the UE. However, in this case, the original primary eNB has become a new secondary base station. Therefore, during key update, based on an existing secondary-base-station key update mechanism, the UE produces a new intermediate key KeNB3 by using a current intermediate key KeNB1 between the UE and the original primary eNB and a secondary-base-station counter configured by a new primary eNB for the UE. If the secondary-base-station counter configured by the new primary eNB for the UE is the same as the original secondary-base-station counter, the intermediate key KeNB3 updated by the UE on the original primary eNB is the same as KeNB2.

The following manners and other manners may be used to prevent a UE from using a same intermediate key on a new primary base station and a new second base station in key update.

In an implementation, the second base station produces a second intermediate key between the second base station and the UE based on the first intermediate key of the UE in the first base station and a first counter value pre-configured by the first base station for the UE, and produces a first final key between the second base station and the UE based on the second intermediate key, where the first final key is used to encrypt data transmitted by the second base station to the UE;

the second base station receives a key update request message sent by the first base station;

the second base station produces a third intermediate key by using the first intermediate key of the UE in the first base station and a second counter value pre-configured by the second base station for the UE; and adds the third intermediate key to a key update response message and sends the key update response message to the first base station, where the second counter value is different from the first counter value; and the second base station sends a first-base-station key update command to the UE, where the first-base-station key update command carries the second counter value, so that the UE produces the third intermediate key in the first base station based on the first intermediate key and the second counter value, and produces a second final key between the UE and the first base station based on the third intermediate key, where the second final key is used to encrypt data transmitted by the UE to the first base station.

In another implementation, the second base station produces a fifth intermediate key between the second base station and the UE based on a fourth intermediate key of the UE in the first base station and a third counter value pre-configured by the first base station for the UE, and produces a third final key between the second base station and the UE based on the fifth intermediate key, where the third final key is used to encrypt data transmitted by the second base station to the UE;

the second base station receives a key update request sent by the first base station;

the second base station produces a sixth intermediate key by using the fifth intermediate key of the UE in the second base station and the third counter value; and adds the sixth intermediate key to a key update response message and sends the key update response message to the first base station; and the second base station sends a key update command to the UE, where the key update command carries the fifth intermediate key and the third counter value, so that the UE produces the sixth intermediate key in the first base station based on the fifth intermediate key and the third counter value, and produces a fourth final key between the UE and the first base station based on the sixth intermediate key, where the fourth final key is used to encrypt data transmitted by the UE to the second base station.

According to the communication method in this embodiment of the present disclosure, the UE is connected to the first base station by using the first component carrier, and the first base station sends the preprocessing indication message to the UE, where the preprocessing indication message includes the information about the second component carrier on which the UE performs uplink synchronization with the second base station when performing the preprocessing, and the second component carrier is different from the first component carrier. The preprocessing indication message instructs the UE to perform pre-handover to the second base station or pre-addition of the second base station on the second component carrier. When obtaining the target second base station with which the UE needs to perform data transmission, the first base station sends the first indication message to the target second base station, to instruct the target second base station to perform data transmission with the UE. Before the first base station sends the first indication message to the target second base station, to instruct the target base station to perform data transmission with the UE, the UE has established uplink synchronization with the second base station by using the second component carrier while maintaining the connection to the first base station. Therefore, when actual handover is implemented, and when the first base station sends the first indication message to the target second base station, to instruct the target second base station to perform data transmission with the UE, the UE can be quickly handed over from the first base station to the second base station, so as to reduce a handover latency, and quickly implement data transmission with the second base station.

Figure 5:
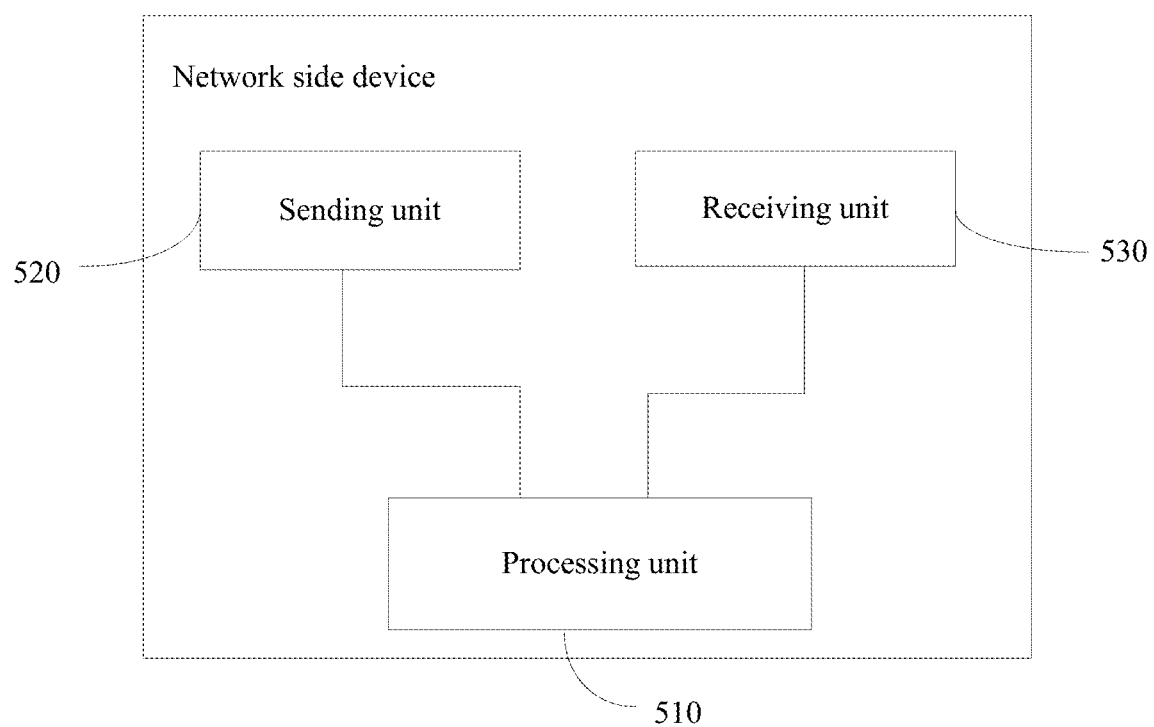
FIG. 5 is a schematic structural diagram of a framework of a network side device according to an embodiment of the present disclosure.

An embodiment of the present disclosure further provides a network side device. FIG. 5 is a schematic structural diagram of a framework of a network side device according to an embodiment of the present disclosure.

Referring to FIG. 5, the network side device provided in this embodiment of the present disclosure is a first base station. The device includes:

a processing unit 510, configured to determine, based on a first measurement report received by the first base station and sent by a user terminal, a second base station that the user terminal is to preprocess, where the preprocessing includes pre-handover to or pre-addition of the second base station, but does not include data transmission by using the second base station, the first base station is connected to the user terminal by using a first component carrier, and the first measurement report includes signal quality information of a current serving cell and signal quality information of a neighboring cell of the current serving cell; and a sending unit 520, configured to send a first request message to the second base station, where the first request message includes indication information indicating that the user terminal is to preprocess the second base station, where the processing unit 510 is further configured to: when the first base station receives a first acknowledgment message returned by the second base station, determine that the user terminal is capable of preprocessing the second base station;

the sending unit 520 is further configured to send a preprocessing indication message to the user terminal, where the preprocessing indication message includes information about a second component carrier on which the user terminal performs uplink synchronization with the second base station when performing the preprocessing, and the second component carrier is different from the first component carrier;

the processing unit 510 is further configured to obtain information about a target second base station with which the user terminal is to perform data transmission; and the sending unit 520 is further configured to send a first indication message to the target second base station, or send the first indication message to the target second base station and a second indication message to the user terminal, to instruct the user terminal to be handed over to the target second base station for data transmission, or to instruct the user terminal to add the target second base station for data transmission.

Optionally, the first measurement report includes a first measurement result corresponding to the current serving cell and a second measurement result corresponding to the neighboring cell of the current serving cell; and the processing unit 510 is configured to: determine, based on the received first measurement report sent by the user terminal, the second base station that the user terminal is capable of preprocessing; and if the first measurement result is less than a first threshold, determine, based on the second measurement result, at least one second base station corresponding to the second measurement result as the second base station that the user terminal is to preprocess, where the second measurement result is greater than the first measurement result.

Optionally, the device further includes:

a receiving unit 530, configured to receive a third indication message sent by the user terminal, where the third indication message carries an identifier of the target second base station, the target second base station is determined by the user terminal based on a second measurement report, and the second measurement report includes signal quality information of the current serving cell and is different from the first measurement report; and the sending unit 520 is configured to: when the receiving unit 530 receives the third indication message, send the first indication message to the target second base station; or the processing unit 510 is configured to determine the target second base station based on a second measurement report sent by the user terminal, and the sending unit 520 is configured to send the first indication message to the target second base station and the second indication message to the user terminal.

Optionally, the first request message further includes a configuration instruction for configuring information, so that the second base station pre-configures an SRB and a DRB for the user terminal according to the configuration instruction; and both the first acknowledgment message and the preprocessing indication message include configuration information of the SRB and configuration information of the DRB.

The receiving unit 530 is configured to: after the sending unit 520 sends the first indication message to the target second base station, receive a second acknowledgment message returned by the target second base station, where the second acknowledgment message includes SRB configuration information and DRB configuration information that are pre-configured by the target second base station for the user terminal; and the sending unit 520 is configured to send, to the user terminal, the second indication message that carries the SRB configuration information and the DRB configuration information.

Optionally, the first request message further includes indication information for instructing the second base station to establish an SRB, and establish a DRB or pre-configure configuration information of a DRB for the user terminal;

both the first acknowledgment message and the preprocessing indication message include information about the established SRB, and information about the established DRB or the configuration information of the DRB; and when the preprocessing indication message includes the information about the established SRB and the configuration information of the DRB, the preprocessing indication message further includes indication information indicating that the second base station has established, based on the configuration information of the DRB, the DRB for the user terminal.

Optionally, the first indication message includes a first intermediate key between the second base station and the user terminal produced by the first base station for the second base station, and information for instructing the user terminal to produce the first intermediate key between the user terminal and the target second base station based on a second intermediate key between the user terminal and the first base station, and produce a final key between the user terminal and the second base station based on the first intermediate key, where the final key is used to encrypt data transmitted by the user terminal to the second base station.

Optionally, the preprocessing indication message includes:

security key information between the user terminal and the second base station pre-configured by the first base station for the user terminal, so that when receiving the second indication message, the user terminal produces the first intermediate key between the user terminal and the second base station by using the second intermediate key between the user terminal and the first base station and the security key information.

Optionally, the preprocessing indication message includes second-base-station security algorithm information pre-configured by the first base station for the user terminal; and the second indication message sent by the first base station to the user terminal includes security key counter information pre-configured by the first base station for the user terminal, so that when receiving the second indication message, the user terminal produces the first intermediate key between the user terminal and the second base station by using the second intermediate key between the user terminal and the first base station, the second-base-station security algorithm information, and the security key counter information.

Optionally, the sending unit 520 is further configured to send first data to the target second base station, where the first data is data that the first base station has not sent to the user terminal yet.

The sending unit 520 is further configured to send a path switching message to an MME, so that the MME switches a data transmission path to the final handed-over-to second base station.

Optionally, the preprocessing indication message further includes a correspondence between the SRB pre-configured by the second base station for the user terminal and an SRB that is maintained by the user terminal and the first base station, and/or a correspondence between the DRB pre-configured by the second base station for the user terminal and a DRB that is maintained by the user terminal and the first base station.

The network side device provided in this embodiment of the present disclosure may execute the technical solutions provided in the foregoing method embodiments, implementation principles and technical effects thereof are similar to those of the technical solutions, and details are not described herein.

Figure 6:
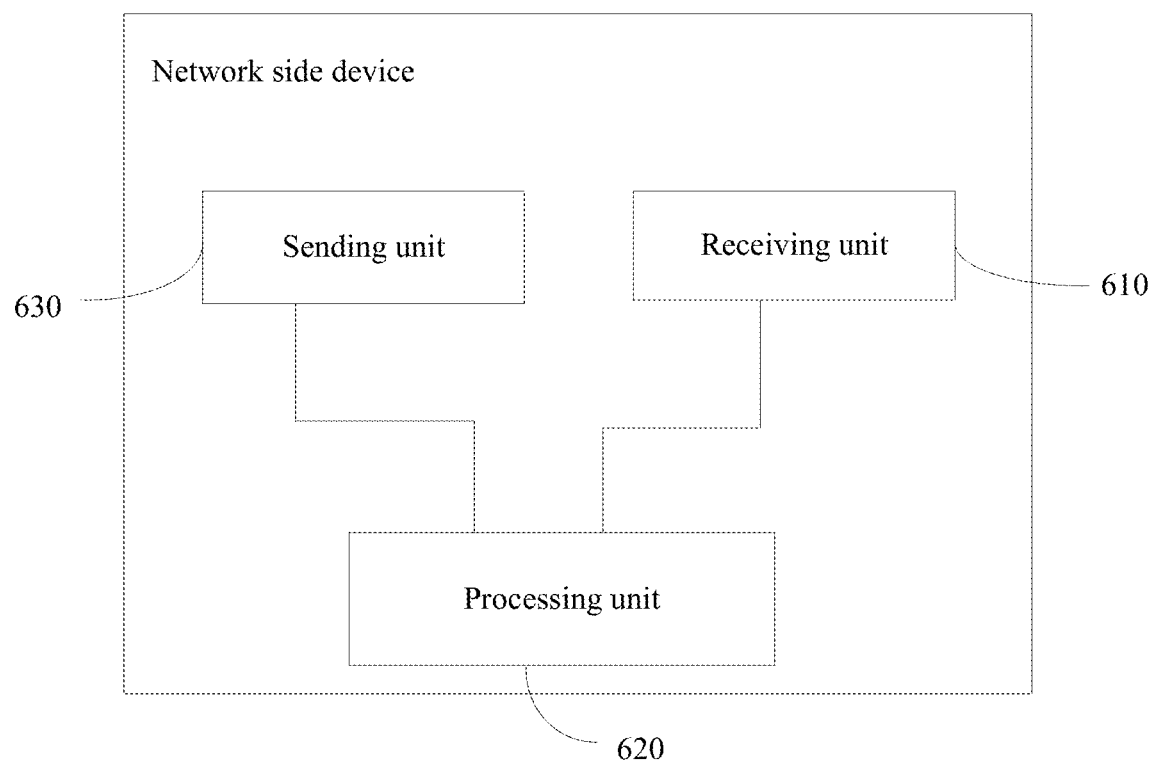
FIG. 6 is a schematic structural diagram of a framework of a network side device according to another embodiment of the present disclosure.

FIG. 6 is a schematic structural diagram of a framework of a network side device according to another embodiment of the present disclosure. The device includes:

a receiving unit 610, configured to receive a first request message sent by a first base station, where the first request message includes an identifier of a user terminal and indication information indicating that the user terminal is to preprocess a second base station, and the preprocessing includes pre-handover of the user terminal to the second base station or pre-addition of the second base station, but does not include data transmission by using the second base station;

a processing unit 620, configured to perform admission control based on the first request message; and a sending unit 630, configured to send a first acknowledgment message to the first base station when the processing unit determines that the user terminal is allowed to perform preprocessing, where the receiving unit 610 is further configured to receive an access request sent by the user terminal, and the processing unit is further configured to synchronize with the user terminal based on the access request; and the receiving unit 610 is further configured to receive a first indication message sent by the first base station, and the processing unit is further configured to implement data transmission between the second base station and the user terminal based on the first indication message.

Optionally, the first request message further includes a configuration instruction for configuring information, and the processing unit is further configured to pre-configure an SRB and a DRB for the user terminal according to the configuration instruction; and the first acknowledgment message includes configuration information of the SRB and configuration information of the DRB.

Optionally, the processing unit 620 is configured to: after the receiving unit 610 receives the first indication message sent by the first base station, establish the SRB and the DRB between the second base station and the user terminal based on the first indication message, and the configuration information of the SRB and the configuration information of the DRB that have been locally stored in the second base station; and the sending unit 630 is further configured to send a path switching message to an MME, so that the MME switches a data transmission path to the second base station based on the received path switching message.

Optionally, the sending unit 630 is configured to: after the receiving unit receives the first indication message sent by the first base station, send a second acknowledgment message to the first base station, where the second acknowledgment message includes SRB configuration information and DRB configuration information that are pre-configured by the second base station for the user terminal;

the processing unit 620 is configured to establish an SRB and a DRB between the second base station and the user terminal based on the first indication message and the SRB configuration information and the DRB configuration information; and the sending unit 630 is further configured to send a path switching message to an MME, so that the MME switches a data transmission path to the second base station based on the received path switching message.

Optionally, the first indication message includes a first intermediate key between the second base station and the user terminal produced by the first base station for the second base station, and indication information indicating that the user terminal is to produce, based on the first intermediate key, a final key between the user terminal and the second base station, and encrypt the transmitted data based on the final key.

Optionally, the receiving unit 610 is further configured to receive first data sent by the first base station, where the first data is data that the first base station has not sent to the user terminal yet.

Optionally, the processing unit 620 is further configured to:

produce a second intermediate key between the second base station and the user terminal based on the first intermediate key of the user terminal in the first base station and a first counter value pre-configured by the first base station for the user terminal, and produce a first final key between the second base station and the user terminal based on the second intermediate key, where the first final key is used to encrypt data transmitted by the second base station to the user terminal;

the receiving unit 630 is further configured to receive a key update request message sent by the first base station;

the processing unit 620 is further configured to: produce a third intermediate key by using the first intermediate key of the user terminal in the first base station and a second counter value pre-configured by the second base station for the user terminal; and add the third intermediate key to a key update response message and send the key update response message to the first base station, where the second counter value is different from the first counter value; and the sending unit 630 is further configured to: send a first-base-station key update command to the user terminal, where the first-base-station key update command carries the second counter value, so that the user terminal produces the third intermediate key in the first base station based on the first intermediate key and the second counter value, and produces a second final key between the user terminal and the first base station based on the third intermediate key, where the second final key is used to encrypt data transmitted by the user terminal to the first base station.

Optionally, the processing unit 620 is further configured to: produce a fifth intermediate key between the second base station and the user terminal based on a fourth intermediate key of the user terminal in the first base station and a third counter value pre-configured by the first base station for the user terminal, and produce a third final key between the second base station and the user terminal based on the fifth intermediate key, where the third final key is used to encrypt data transmitted by the second base station to the user terminal;

the receiving unit 610 is further configured to receive a key update request sent by the first base station;

the processing unit 620 is further configured to: produce a sixth intermediate key by using the fifth intermediate key of the user terminal in the second base station and the third counter value; and add the sixth intermediate key to a key update response message and send the key update response message to the first base station; and the sending unit 630 is further configured to: send a key update command to the user terminal, where the key update command carries the fifth intermediate key and the third counter value, so that the user terminal produces the sixth intermediate key in the first base station based on the fifth intermediate key and the third counter value, and produces a fourth final key between the user terminal and the first base station based on the sixth intermediate key, where the fourth final key is used to encrypt data transmitted by the user terminal to the second base station.

The network side device provided in this embodiment of the present disclosure may execute the technical solutions provided in the foregoing method embodiments, implementation principles and technical effects thereof are similar to those of the technical solutions, and details are not described herein.

Figure 7:
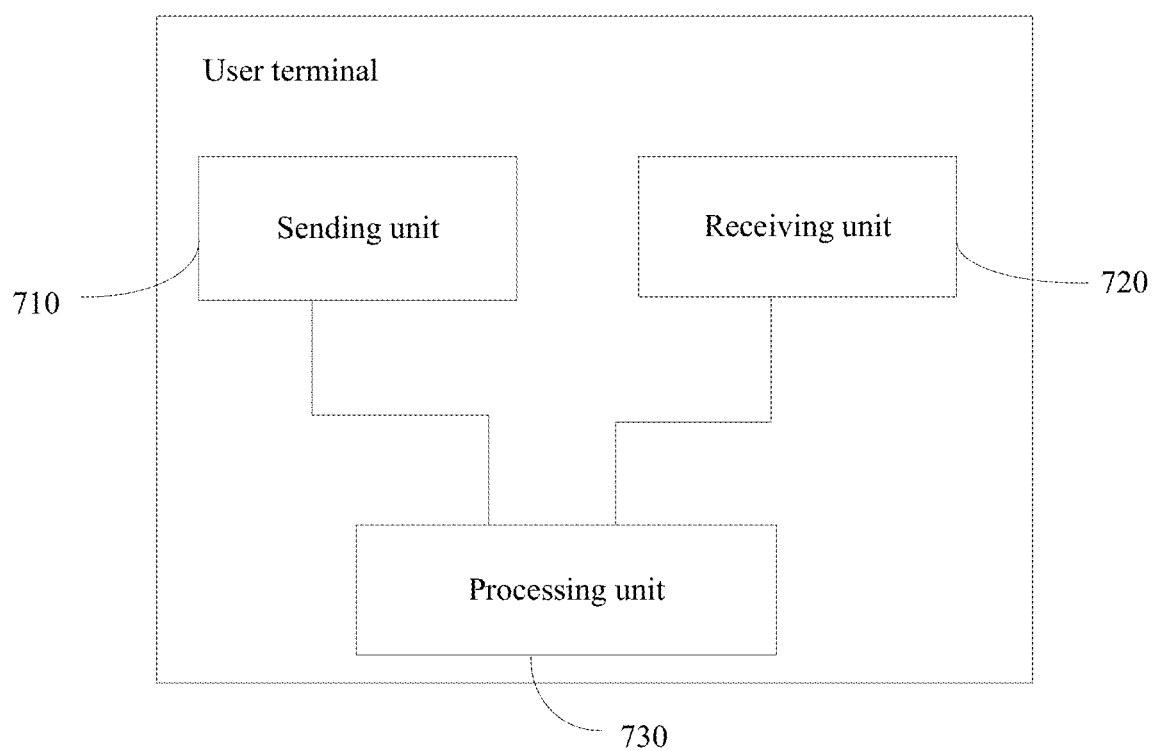
FIG. 7 is a schematic structural diagram of a framework of a user terminal according to another embodiment of the present disclosure.

An embodiment of the present disclosure further provides a user terminal. FIG. 7 is a schematic structural diagram of a framework of a user terminal according to another embodiment of the present disclosure.

Referring to FIG. 7, the user terminal provided in the another embodiment of the present disclosure includes:

a sending unit 710, configured to send a first measurement report to a first base station, so that the first base station determines, based on the first measurement report, a second base station that the user terminal is to preprocess, where the preprocessing includes pre-handover to or pre-addition of the second base station, but does not include data transmission by using the second base station, the user terminal is connected to the first base station by using a first component carrier, and the first measurement report includes signal quality information of a current serving cell and signal quality information of a neighboring cell of the current serving cell;

a receiving unit 720, configured to receive a preprocessing indication message sent by the first base station, where the preprocessing indication message includes information about a second component carrier on which the user terminal performs uplink synchronization with the second base station when performing the preprocessing, and the second component carrier is different from the first component carrier, where the sending unit 710 is further configured to send, based on the preprocessing indication message, a random access request to the second base station on the second component carrier, to implement the preprocessing on the second base station; and the receiving unit 720 is further configured to receive a second indication message sent by the first base station; and a processing unit 730, configured to implement data transmission between the user terminal and the second base station based on the second indication message.

Optionally, the preprocessing indication message further includes SRB configuration information and DRB configuration information that are pre-configured by the second base station for the user terminal; and the processing unit 730 is configured to: after the receiving unit 720 receives the second indication message sent by the first base station, establish an SRB and a DRB between the user terminal and the second base station based on the SRB configuration information and the DRB configuration information, to implement data transmission with the second base station.

Optionally, the second indication message further includes SRB configuration information and DRB configuration information that are pre-configured by the second base station for the user terminal; and the processing unit 730 is configured to: after the receiving unit 720 receives the second indication message sent by the first base station, establish an SRB and a DRB between the user terminal and the second base station based on the SRB configuration information and the DRB configuration information in the second indication message, to implement data transmission with the second base station.

Optionally, the processing unit 730 is further configured to: produce a second intermediate key of the user terminal in the second base station based on a first intermediate key of the user terminal in the first base station and a first counter value pre-configured by the first base station for the user terminal, and produce a first final key of the user terminal in the second base station based on the second intermediate key, where the first final key is used to encrypt data transmitted by the user terminal to the second base station;

the receiving unit 720 is further configured to receive a first-base-station key update command sent by the second base station, where the first-base-station key update command includes a second counter value pre-configured by the second base station for the user terminal, and the second counter value is different from the first counter value; and the processing unit 730 is further configured to: produce a third intermediate key of the user terminal in the first base station based on the first intermediate key and the second counter value, and produce a second final key of the user terminal in the first base station based on the third intermediate key, where the second final key is used to encrypt data transmitted by the user terminal to the first base station.

Optionally, the processing unit 730 is further configured to: produce a fifth intermediate key of the user terminal in the second base station based on a fourth intermediate key in the first base station and a third counter value pre-configured by the first base station for the user terminal, and produce a third final key of the user terminal in the second base station based on the fifth intermediate key, where the third final key is used to encrypt data transmitted by the user terminal to the second base station;

the receiving unit 720 is further configured to receive a first-base-station key update command sent by the second base station, where the first-base-station key update command includes the fifth intermediate key and the third counter value; and the processing unit 730 is further configured to: produce a sixth intermediate key in the first base station based on the fifth intermediate key and the third counter value, and produce a fourth final key between second base station and the user terminal based on the sixth intermediate key, where the fourth final key is used to encrypt data transmitted by the user terminal to the second base station.

Optionally, the preprocessing indication message further includes indication information for instructing the user terminal to preprocess the second base station; and the processing unit 730 is further configured to determine, based on the indication information, to maintain a connection between the user terminal and the first base station.

The user terminal provided in this embodiment of the present disclosure may execute the technical solutions provided in the foregoing method embodiments, implementation principles and technical effects thereof are similar to those of the technical solutions, and details are not described herein.

Figure 8:
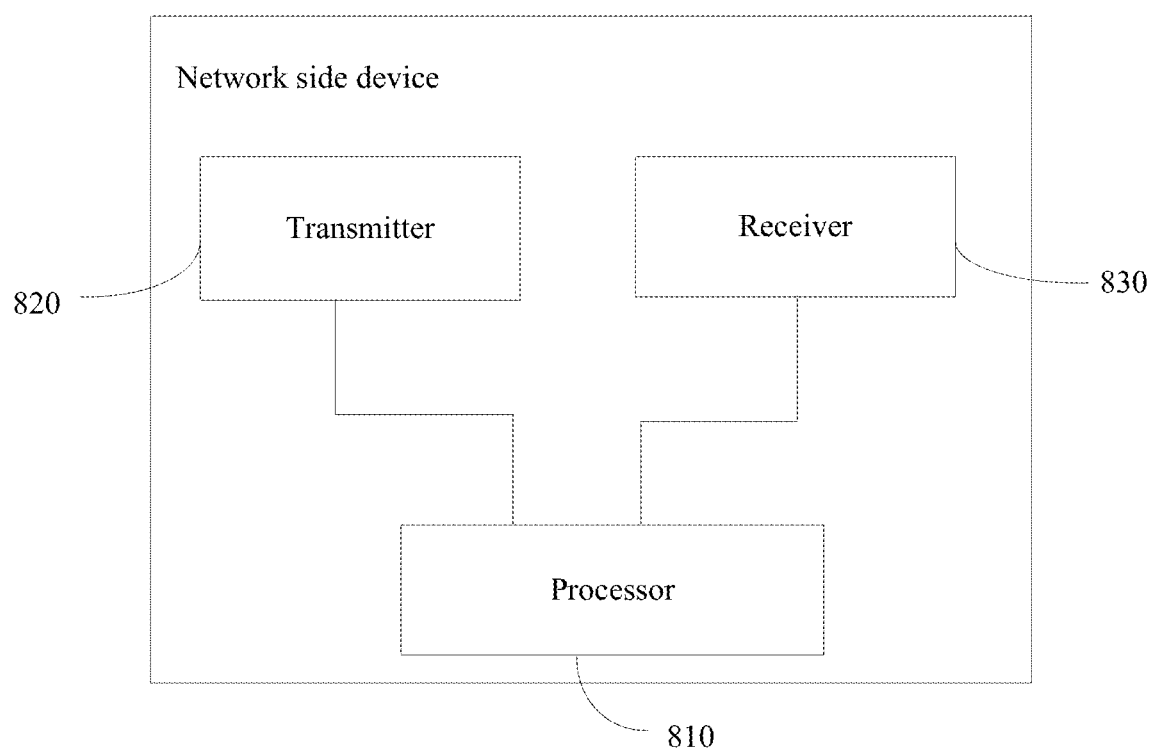
FIG. 8 is a schematic structural diagram of a framework of a network side device according to another embodiment of the present disclosure.

FIG. 8 is a schematic structural diagram of a framework of a network side device according to another embodiment of the present disclosure.

Referring to FIG. 8, another embodiment of the present disclosure further provides a network side device, and the network side device is a first base station. The first base station includes:

a processor 810, configured to determine, based on a first measurement report received by the first base station and sent by a user terminal, a second base station that the user terminal is to preprocess, where the preprocessing includes pre-handover to or pre-addition of the second base station, but does not include data transmission by using the second base station, the first base station is connected to the user terminal by using a first component carrier, and the first measurement report includes signal quality information of a current serving cell and signal quality information of a neighboring cell of the current serving cell; and a transmitter 820, configured to send a first request message to the second base station, where the first request message includes indication information indicating that the user terminal is to preprocess the second base station, where the processor 810 is further configured to: when the first base station receives a first acknowledgment message returned by the second base station, determine that the user terminal is capable of preprocessing the second base station;

the transmitter 820 is further configured to send a preprocessing indication message to the user terminal, where the preprocessing indication message includes information about a second component carrier on which the user terminal performs uplink synchronization with the second base station when performing the preprocessing, and the second component carrier is different from the first component carrier;

the processor 810 is further configured to obtain information about a target second base station with which the user terminal is to perform data transmission; and the transmitter 820 is further configured to send a first indication message to the target second base station, or send the first indication message to the target second base station and a second indication message to the user terminal, to instruct the user terminal to be handed over to the target second base station for data transmission, or to instruct the user terminal to add the target second base station for data transmission.

Optionally, the first measurement report includes a first measurement result corresponding to the current serving cell and a second measurement result corresponding to the neighboring cell of the current serving cell; and the processor 810 is configured to: determine, based on the received first measurement report sent by the user terminal, the second base station that the user terminal is capable of preprocessing; and if the first measurement result is less than a first threshold, determine, based on the second measurement result, at least one second base station corresponding to the second measurement result as the second base station that the user terminal is to preprocess, where the second measurement result is greater than the first measurement result.

Optionally, the device further includes:

a receiver 830, configured to receive a third indication message sent by the user terminal, where the third indication message carries an identifier of the target second base station, the target second base station is determined by the user terminal based on a second measurement report, and the second measurement report includes signal quality information of the current serving cell and is different from the first measurement report; and the transmitter 820 is configured to: when the receiver receives the third indication message, send the first indication message to the target second base station; or the processor 810 is configured to determine the target second base station based on a second measurement report sent by the user terminal, and the transmitter 820 is configured to send the first indication message to the target second base station and the second indication message to the user terminal.

Optionally, the first request message further includes a configuration instruction for configuring information, so that the second base station pre-configures an SRB and a DRB for the user terminal according to the configuration instruction; and both the first acknowledgment message and the preprocessing indication message include configuration information of the SRB and configuration information of the DRB.

The receiver 830 is configured to: after the transmitter 820 sends the first indication message to the target second base station, receive a second acknowledgment message returned by the target second base station, where the second acknowledgment message includes SRB configuration information and DRB configuration information that are pre-configured by the target second base station for the user terminal; and the transmitter 820 is configured to send, to the user terminal, the second indication message that carries the SRB configuration information and the DRB configuration information.

Optionally, the first request message further includes indication information for instructing the second base station to establish an SRB, and establish a DRB or pre-configure configuration information of a DRB for the user terminal;

both the first acknowledgment message and the preprocessing indication message include information about the established SRB, and information about the established DRB or the configuration information of the DRB; and when the preprocessing indication message includes the information about the established SRB and the configuration information of the DRB, the preprocessing indication message further includes indication information indicating that the second base station has established, based on the configuration information of the DRB, the DRB for the user terminal.

Optionally, the first indication message includes a first intermediate key between the second base station and the user terminal produced by the first base station for the second base station, and information for instructing the user terminal to produce the first intermediate key between the user terminal and the target second base station based on a second intermediate key between the user terminal and the first base station, and produce a final key between the user terminal and the second base station based on the first intermediate key, where the final key is used to encrypt data transmitted by the user terminal to the second base station.

Optionally, the preprocessing indication message includes:

security key information between the user terminal and the second base station pre-configured by the first base station for the user terminal, so that when receiving the second indication message, the user terminal produces the first intermediate key between the user terminal and the second base station by using the second intermediate key between the user terminal and the first base station and the security key information.

Optionally, the preprocessing indication message includes second-base-station security algorithm information pre-configured by the first base station for the user terminal; and the second indication message sent by the first base station to the user terminal includes security key counter information pre-configured by the first base station for the user terminal, so that when receiving the second indication message, the user terminal produces the first intermediate key between the user terminal and the second base station by using the second intermediate key between the user terminal and the first base station, the second-base-station security algorithm information, and the security key counter information.

Optionally, the transmitter 820 is further configured to send first data to the target second base station, where the first data is data that the first base station has not sent to the user terminal yet.

Optionally, the transmitter 820 is further configured to send a path switching message to an MME, so that the MME switches a data transmission path to the final handed-over-to second base station.

Optionally, the preprocessing indication message further includes a correspondence between the SRB pre-configured by the second base station for the user terminal and an SRB that is maintained by the user terminal and the first base station, and/or a correspondence between the DRB pre-configured by the second base station for the user terminal and a DRB that is maintained by the user terminal and the first base station.

The base station provided in this embodiment of the present disclosure may execute the technical solutions provided in the foregoing method embodiments, implementation principles and technical effects thereof are similar to those of the technical solutions, and details are not described herein.

Figure 9:
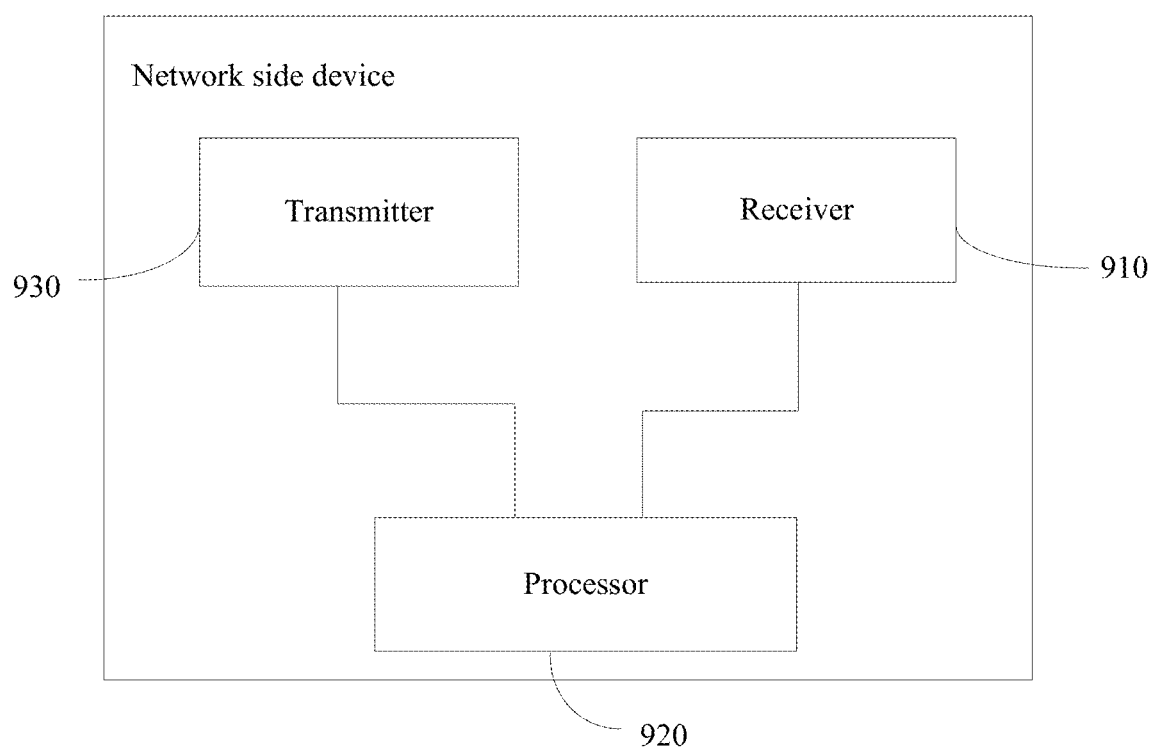
FIG. 9 is a schematic structural diagram of a framework of a network side device according to another embodiment of the present disclosure.

FIG. 9 is a schematic structural diagram of a framework of a network side device according to another embodiment of the present disclosure.

Referring to FIG. 9, an embodiment of the present disclosure further provides a network side device, and the network side device is a second base station. The second base station includes:

a receiver 910, configured to receive a first request message sent by a first base station, where the first request message includes an identifier of a user terminal and indication information indicating that the user terminal is to preprocess the second base station, and the preprocessing includes pre-handover of the user terminal to the second base station or pre-addition of the second base station, but does not include data transmission by using the second base station;

a processor 920, configured to perform admission control based on the first request message; and a transmitter 930, configured to send a first acknowledgment message to the first base station when the processor determines that the user terminal is allowed to perform preprocessing, where the receiver 910 is further configured to receive an access request sent by the user terminal, and the processor is further configured to synchronize with the user terminal based on the access request; and the receiver 910 is further configured to receive a first indication message sent by the first base station, and the processor is further configured to implement data transmission between the second base station and the user terminal based on the first indication message.

Optionally, the first request message further includes a configuration instruction for configuring information, and the processor is further configured to pre-configure an SRB and a DRB for the user terminal according to the configuration instruction; and the first acknowledgment message includes configuration information of the SRB and configuration information of the DRB.

Optionally, the processor 920 is configured to: after the receiver 910 receives the first indication message sent by the first base station, establish the SRB and the DRB between the second base station and the user terminal based on the first indication message, and the configuration information of the SRB and the configuration information of the DRB that have been locally stored in the second base station; and the transmitter 930 is further configured to send a path switching message to an MME, so that the MME switches a data transmission path to the second base station based on the received path switching message.

Optionally, the transmitter 930 is configured to send a second acknowledgment message to the first base station, where the second acknowledgment message includes SRB configuration information and DRB configuration information that are pre-configured by the second base station for the user terminal;

the processor 920 is configured to establish an SRB and a DRB between the second base station and the user terminal based on the first indication message and the SRB configuration information and the DRB configuration information; and the transmitter 930 is further configured to send a path switching message to an MME, so that the MME switches a data transmission path to the second base station based on the received path switching message.

Optionally, the first indication message includes a first intermediate key between the second base station and the user terminal produced by the first base station for the second base station, and indication information indicating that the user terminal is to produce, based on the first intermediate key, a final key between the user terminal and the second base station, and encrypt the transmitted data based on the final key.

Optionally, the receiver 910 is further configured to receive first data sent by the first base station, where the first data is data that the first base station has not sent to the user terminal yet.

Optionally, the processor 920 is further configured to:

produce a second intermediate key between the second base station and the user terminal based on the first intermediate key of the user terminal in the first base station and a first counter value pre-configured by the first base station for the user terminal, and produce a first final key between the second base station and the user terminal based on the second intermediate key, where the first final key is used to encrypt data transmitted by the second base station to the user terminal;

the receiver 910 is further configured to receive a key update request message sent by the first base station;

the processor 920 is further configured to: produce a third intermediate key by using the first intermediate key of the user terminal in the first base station and a second counter value pre-configured by the second base station for the user terminal; and add the third intermediate key to a key update response message and send the key update response message to the first base station, where the second counter value is different from the first counter value; and the transmitter 930 is further configured to: send a first-base-station key update command to the user terminal, where the first-base-station key update command carries the second counter value, so that the user terminal produces the third intermediate key in the first base station based on the first intermediate key and the second counter value, and produces a second final key between the user terminal and the first base station based on the third intermediate key, where the second final key is used to encrypt data transmitted by the user terminal to the first base station.

Optionally, the processor 920 is further configured to: produce a fifth intermediate key between the second base station and the user terminal based on a fourth intermediate key of the user terminal in the first base station and a third counter value pre-configured by the first base station for the user terminal, and produce a third final key between the second base station and the user terminal based on the fifth intermediate key, where the third final key is used to encrypt data transmitted by the second base station to the user terminal;

the receiver 910 is further configured to receive a key update request sent by the first base station;

the processor 920 is further configured to: produce a sixth intermediate key by using the fifth intermediate key of the user terminal in the second base station and the third counter value; and add the sixth intermediate key to a key update response message and send the key update response message to the first base station; and the transmitter 930 is further configured to: send a key update command to the user terminal, where the key update command carries the fifth intermediate key and the third counter value, so that the user terminal produces the sixth intermediate key in the first base station based on the fifth intermediate key and the third counter value, and produces a fourth final key between the user terminal and the first base station based on the sixth intermediate key, where the fourth final key is used to encrypt data transmitted by the user terminal to the second base station.

The base station provided in this embodiment of the present disclosure may execute the technical solutions provided in the foregoing method embodiments, implementation principles and technical effects thereof are similar to those of the technical solutions, and details are not described herein.

Figure 10:
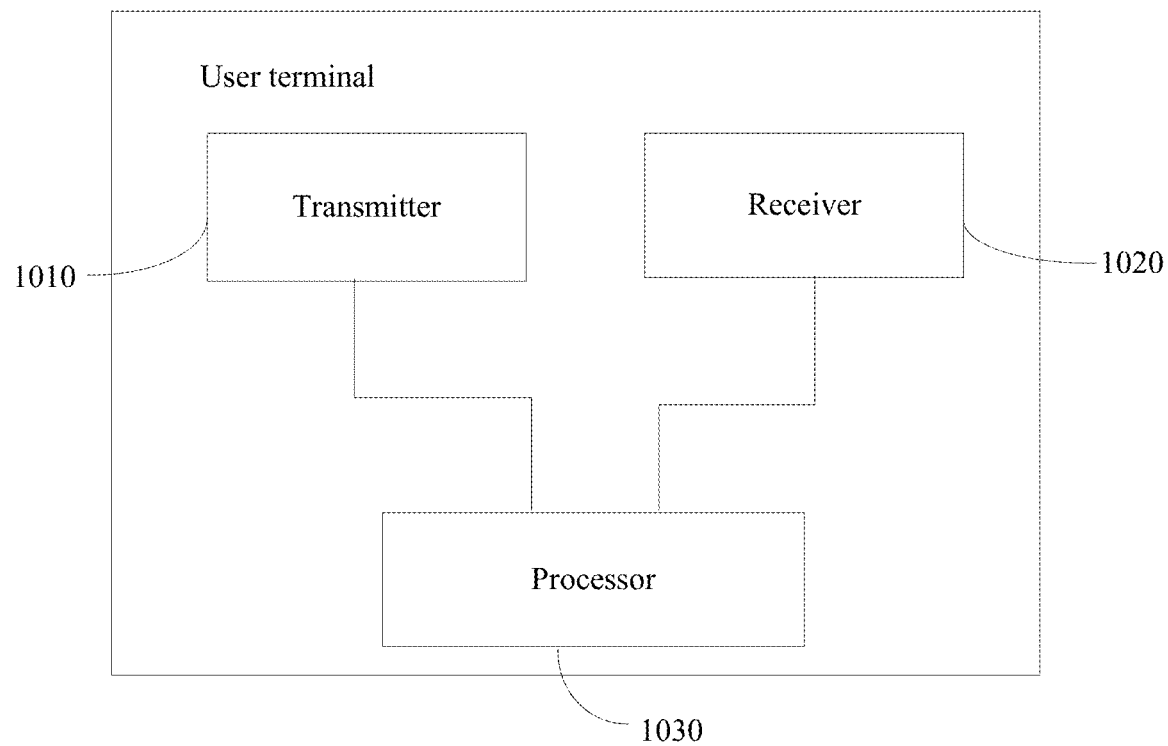
FIG. 10 is a schematic structural diagram of a framework of a user terminal according to another embodiment of the present disclosure.

Another embodiment of the present disclosure further provides a user terminal. FIG. 10 is a schematic structural diagram of a framework of a user terminal according to another embodiment of the present disclosure.

Referring to FIG. 10, an embodiment of the present disclosure further provides a user terminal. The user terminal includes:

a transmitter 1010, configured to send a first measurement report to a first base station, so that the first base station determines, based on the first measurement report, a second base station that the user terminal is to preprocess, where the preprocessing includes pre-handover to or pre-addition of the second base station, but does not include data transmission by using the second base station, the user terminal is connected to the first base station by using a first component carrier, and the first measurement report includes signal quality information of a current serving cell and signal quality information of a neighboring cell of the current serving cell;

a receiver 1020, configured to receive a preprocessing indication message sent by the first base station, where the preprocessing indication message includes information about a second component carrier on which the user terminal performs uplink synchronization with the second base station when performing the preprocessing, and the second component carrier is different from the first component carrier, where the transmitter 1010 is further configured to send, based on the preprocessing indication message, a random access request to the second base station on the second component carrier, to implement the preprocessing on the second base station; and the receiver 1020 is further configured to receive a second indication message sent by the first base station; and a processor 1030, configured to implement data transmission between the user terminal and the second base station based on the second indication message.

Optionally, the preprocessing indication message further includes SRB configuration information and DRB configuration information that are pre-configured by the second base station for the user terminal; and the processor 1030 is configured to: after the receiver 1020 receives the second indication message sent by the first base station, establish an SRB and a DRB between the user terminal and the second base station based on the SRB configuration information and the DRB configuration information, to implement data transmission with the second base station.

Optionally, the second indication message further includes SRB configuration information and DRB configuration information that are pre-configured by the second base station for the user terminal; and the processor 1030 is configured to: after the receiver 1020 receives the second indication message sent by the first base station, establish an SRB and a DRB between the user terminal and the second base station based on the SRB configuration information and the DRB configuration information in the second indication message, to implement data transmission with the second base station.

Optionally, the processor 1030 is further configured to: produce a second intermediate key of the user terminal in the second base station based on a first intermediate key of the user terminal in the first base station and a first counter value pre-configured by the first base station for the user terminal, and produce a first final key of the user terminal in the second base station based on the second intermediate key, where the first final key is used to encrypt data transmitted by the user terminal to the second base station;

the receiver 1020 is further configured to receive a first-base-station key update command sent by the second base station, where the first-base-station key update command includes a second counter value pre-configured by the second base station for the user terminal, and the second counter value is different from the first counter value; and the processor 1030 is further configured to: produce a third intermediate key of the user terminal in the first base station based on the first intermediate key and the second counter value, and produce a second final key of the user terminal in the first base station based on the third intermediate key, where the second final key is used to encrypt data transmitted by the user terminal to the first base station.

Optionally, the processor 1030 is further configured to: produce a fifth intermediate key of the user terminal in the second base station based on a fourth intermediate key in the first base station and a third counter value pre-configured by the first base station for the user terminal, and produce a third final key of the user terminal in the second base station based on the fifth intermediate key, where the third final key is used to encrypt data transmitted by the user terminal to the second base station;

the receiver 1020 is further configured to receive a first-base-station key update command sent by the second base station, where the first-base-station key update command includes the fifth intermediate key and the third counter value; and the processor 1030 is further configured to: produce a sixth intermediate key in the first base station based on the fifth intermediate key and the third counter value, and produce a fourth final key between second base station and the user terminal based on the sixth intermediate key, where the fourth final key is used to encrypt data transmitted by the user terminal to the second base station.

Optionally, the preprocessing indication message further includes indication information for instructing the user terminal to preprocess the second base station; and the processor 1030 is further configured to determine, based on the indication information, to maintain a connection between the user terminal and the first base station.

The mobile terminal provided in this embodiment of the present disclosure may execute the technical solutions provided in the foregoing method embodiments, implementation principles and technical effects thereof are similar to those of the technical solutions, and details are not described herein.

Figure 11:
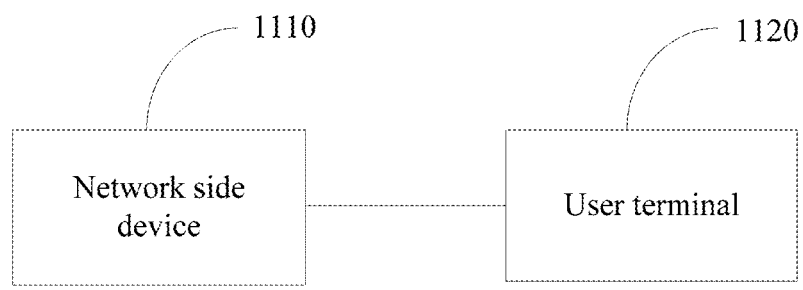
FIG. 11 is a schematic structural diagram of a framework of a communications system according to another embodiment of the present disclosure.

FIG. 11 is a schematic structural diagram of a framework of a communications system according to another embodiment of the present disclosure.

Referring to FIG. 11, the communications system provided in this embodiment of the present disclosure includes a network side device and a user terminal as those provided in any one of the foregoing embodiments.

The communications system provided in this embodiment of the present disclosure may execute the technical solutions provided in the foregoing method embodiments, implementation principles and technical effects thereof are similar to those of the technical solutions, and details are not described herein.

Persons of ordinary skill in the art may understand that all or some of the steps of the method embodiments may be implemented by a program instructing relevant hardware. The program may be stored in a storage medium that can be read by a computer, a mobile phone, or another portable apparatus. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A first base station comprising:
   a processor; and
   a non-transitory memory, wherein the memory stores instructions, and the processor executes the instructions to cause the first base station to perform the following steps:
      determining, based on a first measurement report received from a user terminal, a second base station that the user terminal is to preprocess, wherein the preprocessing comprises pre-handover to the second base station or pre-addition of the second base station without data transmission using the second base station, wherein the first base station is connected to the user terminal using a first component carrier, and wherein the first measurement report comprises signal quality information of a current serving cell and signal quality information of a neighboring cell of the current serving cell;
      sending a first request message to the second base station, wherein the first request message comprises indication information indicating that the user terminal is to preprocess the second base station;
      determining, in response to receiving a first acknowledgment message from the second base station, that the user terminal is capable of preprocessing the second base station, and sending a preprocessing indication message to the user terminal, wherein the preprocessing indication message comprises information about a second component carrier on which the user terminal performs uplink synchronization with the second base station when performing the preprocessing, and the second component carrier is different from the first component carrier, wherein the preprocessing indication message further comprises security key information between the user terminal and the second base station pre-configured by the first base station for the user terminal, so that when receiving a second indication message from the first base station, the user terminal produces a first intermediate key between the user terminal and the second base station using a second intermediate key between the user terminal and the first base station and the security key information; and
      sending a first indication message to the second base station to cause the user terminal to be handed over to the second base station for data transmission or to cause the user terminal to add the second base station for data transmission.

2. The first base station according to claim 1, wherein the first measurement report comprises a first measurement result corresponding to the current serving cell and a second measurement result corresponding to the neighboring cell of the current serving cell; and
   the determining, by the first base station based on the first measurement report received from the user terminal, the second base station that the user terminal is capable of preprocessing comprises:
      in response to determining that the first measurement result is less than a first threshold, determining, based on the second measurement result, at least one base station corresponding to the second measurement result as the second base station that the user terminal is to preprocess, wherein the second measurement result is greater than the first measurement result.

3. The first base station according to claim 1, wherein the processor further executes the instructions to cause the first base station to perform the following steps:
   receiving a third indication message from the user terminal, wherein the third indication message carries an identifier of the second base station, and the second base station is determined by the user terminal based on a second measurement report; and
   determining the second base station based on the second measurement report received from the user terminal, and sending the first indication message to the second base station and a second indication message to the user terminal.

4. The first base station according to claim 1, wherein:
   the first request message further comprises a configuration instruction for configuring information, so that the second base station pre-configures an signaling radio bearer (SRB) and a data radio bearer (DRB) for the user terminal according to the configuration instruction; and
   both the first acknowledgment message and the preprocessing indication message comprise configuration information of the SRB and configuration information of the DRB.

5. The first base station according to claim 1, wherein the sending the first indication message to the second base station comprises:
   receiving a second acknowledgment message returned by the second base station, wherein the second acknowledgment message comprises signaling radio bearer (SRB) configuration information and data radio bearer (DRB) configuration information that are pre-configured by the second base station for the user terminal; and
   sending, to the user terminal, the second indication message that carries the SRB configuration information and the DRB configuration information.

6. The first base station according to claim 1, wherein:
   the first request message further comprises indication information for instructing the second base station to establish a signaling radio bearer (SRB), and establish a data radio bearer (DRB) or pre-configure configuration information of a DRB for the user terminal;
   both the first acknowledgment message and the preprocessing indication message comprise information about the established SRB, and information about the established DRB or the configuration information of the DRB; and when the preprocessing indication message comprises the information about the established SRB and the configuration information of the DRB, the preprocessing indication message further comprises indication information indicating that the second base station has established, based on the configuration information of the DRB, the DRB for the user terminal.

7. The first base station according to claim 1, wherein the execution instruction to enable the device to:

send a path switching message to a mobility management entity (MME), so that the MME switches a data transmission path to the second base station.

8. The first base station according to claim 1, wherein the preprocessing indication message further comprises a correspondence between a signaling radio bearer (SRB) pre-configured by the second base station for the user terminal and an SRB that is maintained by the user terminal and the first base station, and/or a correspondence between data radio bearer (DRB) pre-configured by the second base station for the user terminal and a DRB that is maintained by the user terminal and the first base station.

9. A second base station comprising:

a processor; and a non-transitory memory, wherein the memory stores instructions, and the processor executes the instructions to cause the second base station to perform the following steps:

receiving a first request message from a first base station, wherein the first request message comprises an identifier of a user terminal and indication information indicating that the user terminal is to preprocess the second base station, and the preprocessing comprises pre-handover of the user terminal to the second base station or pre-addition of the second base station without data transmission using the second base station;

performing admission control based on the first request message, and returning a first acknowledgment message to the first base station in response to determining that the user terminal is allowed to perform preprocessing;

receiving an access request from the user terminal, and synchronizing with the user terminal based on the access request;

receiving a first indication message from the first base station, and performing corresponding handover processing based on the first indication message to implement data transmission with the user terminal;

producing a second intermediate key between the second base station and the user terminal based on a first intermediate key of the user terminal in the first base station and a first counter value pre-configured by the first base station for the user terminal, and producing a first final key between the second base station and the user terminal based on the second intermediate key, wherein the first final key is used to encrypt data transmitted by the second base station to the user terminal;

receiving a key update request message from the first base station;

producing a third intermediate key using the first intermediate key of the user terminal in the first base station and a second counter value pre-configured by the second base station for the user terminal, and adding the third intermediate key to a key update response message and sending the key update response message to the first base station, wherein the second counter value is different from the first counter value; and sending a first-base-station key update command to the user terminal, wherein the first-base-station key update command carries the second counter value, so that the user terminal produces the third intermediate key in the first base station based on the first intermediate key and the second counter value, and produces a second final key between the user terminal and the first base station based on the third intermediate key, wherein the second final key is used to encrypt data transmitted by the user terminal to the first base station.

10. The second base station according to claim 9, wherein the first request message further comprises a configuration instruction for configuring information, and the execution instruction to enable the device to pre-configure a signaling radio bearer (SRB) and a data radio bearer (DRB) for the user terminal according to the configuration instruction, wherein the first acknowledgment message comprises configuration information of the SRB and configuration information of the DRB.

11. The second base station according to claim 10, wherein the receiving the first indication message from the first base station, and performing corresponding handover processing based on the first indication message to implement data transmission with the user terminal comprises:

establishing the SRB and the DRB between the second base station and the user terminal based on the first indication message, and the configuration information of the SRB and the configuration information of the DRB locally stored in the second base station; and sending a path switching message to a mobility management entity (MME), so that the MME switches a data transmission path to the second base station based on the path switching message.

12. The second base station according to claim 9, wherein the receiving the first indication message from the first base station, and performing corresponding handover processing based on the first indication message to implement data transmission with the user terminal comprises:

sending a second acknowledgment message to the first base station, wherein the second acknowledgment message comprises signaling radio bearer (SRB) configuration information and data radio bearer (DRB) configuration information that are pre-configured by the second base station for the user terminal;

establishing an SRB and a DRB between the second base station and the user terminal based on the first indication message and the SRB configuration information and the DRB configuration information; and sending a path switching message to a mobility management entity (MME), so that the MME switches a data transmission path to the second base station based on the received path switching message.

13. A user terminal comprising:

a processor; and a non-transitory memory, wherein the memory stores instructions, and the processor executes the instructions to cause the user terminal to perform the following steps:

sending a first measurement report to a first base station, the first measurement report is used to determine a second base station that the user terminal is to preprocess, wherein the preprocessing comprises pre-handover to or pre-addition of the second base station without data transmission using the second base station, wherein the user terminal is connected to the first base station using a first component carrier, and the first measurement report comprises signal quality information of a current serving cell and signal quality information of a neighboring cell of the current serving cell;

receiving a preprocessing indication message from the first base station, wherein the preprocessing indication message comprises information about a second component carrier on which the user terminal performs uplink synchronization with the second base station when performing the preprocessing, and the second component carrier is different from the first component carrier;

sending based on the preprocessing indication message, a random access request to the second base station on the second component carrier, to implement the preprocessing on the second base station;

receiving a second indication message from the first base station, and implementing data transmission between the user terminal and the second base station based on the second indication message;

producing a second intermediate key of the user terminal in the second base station based on a first intermediate key in the first base station and a first counter value pre-configured by the first base station for the user terminal, and producing a first final key of the user terminal in the second base station based on the second intermediate key, wherein the first final key is used to encrypt data transmitted by the user terminal to the second base station;

receiving a first-base-station key update command from the second base station wherein the first-base-station key update command comprises a second counter value pre-configured by the second base station for the user terminal, and the second counter value is different from the first counter value; and producing a third intermediate key of the user terminal in the first base station based on the first intermediate key and the second counter value, and producing a second final key of the user terminal in the first base station based on the third intermediate key, wherein the second final key is used to encrypt data transmitted by the user terminal to the first base station.

14. The user terminal according to claim 13, wherein the preprocessing indication message further comprises signaling radio bearer (SRB) configuration information and data radio bearer (DRB) configuration information that are pre-configured by the second base station for the user terminal; and the receiving the second indication message from the first base station, and implementing communication between the user terminal and the second base station based on the second indication message comprises:
receiving the second indication message from the first base station, and establishing an SRB and a DRB between the user terminal and the second base station based on the SRB configuration information and the DRB configuration information, to implement data transmission with the second base station.

15. The user terminal according to claim 13, wherein the second indication message further comprises signaling radio bearer (SRB) configuration information and data radio bearer (DRB) configuration information that are pre-configured by the second base station for the user terminal; and the receiving the second indication message from the first base station, and implementing communication between the user terminal and the second base station based on the second indication message comprises:
receiving the second indication message from the first base station, and establishing an SRB and a DRB between the user terminal and the second base station based on the SRB configuration information and the DRB configuration information in the second indication message, to implement data transmission with the second base station.

16. The user terminal according to claim 13, wherein the processor further executes the instructions to cause the second user terminal to perform the following steps:
produce a fifth intermediate key of the user terminal in the second base station based on a fourth intermediate key in the first base station and a third counter value pre-configured by the first base station for the user terminal, and producing a third final key of the user terminal in the second base station based on the fifth intermediate key, wherein the third final key is used to encrypt data transmitted by the user terminal to the second base station;
receive a first-base-station key update command from the second base station, wherein the first-base-station key update command comprises the fifth intermediate key and the third counter value; and
produce a sixth intermediate key in the first base station based on the fifth intermediate key and the third counter value, and producing a fourth final key between the second base station and the user terminal based on the sixth intermediate key, wherein the fourth final key is used to encrypt data transmitted by the user terminal to the second base station.

17. The user terminal according to claim 13, wherein the preprocessing indication message further comprises indication information for instructing the user terminal to preprocess the second base station, and the user terminal determines, based on the indication information, to maintain a connection to the first base station.

* * * * *